US00RE40682E

(19) United States
(12) Reissued Patent
Schmidt et al.

(10) Patent Number: US RE40,682 E
(45) Date of Reissued Patent: Mar. 24, 2009

(54) TELECOMMUNICATIONS JACK ASSEMBLY

(75) Inventors: John David Schmidt, Shakopee, MN (US); Roy Henneberger, Apple Valley, MN (US); David Coppock, Bloomington, MN (US); Bradley Kessler, Inver Grove Heights, MN (US)

(73) Assignee: ADC Telecommunications, Inc., Eden Prairie, MN (US)

(21) Appl. No.: 11/067,619

(22) Filed: Feb. 25, 2005

Related U.S. Patent Documents

Reissue of:
(64) Patent No.: 6,524,131
Issued: Feb. 25, 2003
Appl. No.: 09/828,575
Filed: Apr. 4, 2001

U.S. Applications:
(63) Continuation of application No. 09/327,053, filed on Jun. 7, 1999, now Pat. No. 6,234,836, which is a continuation-in-part of application No. 09/231,736, filed on Jan. 15, 1999, now Pat. No. 6,334,792.

(51) Int. Cl.
*H01R 24/00* (2006.01)

(52) U.S. Cl. ..... 439/676; 439/553
(58) Field of Classification Search ..... 439/676, 439/544, 552, 553, 354
See application file for complete search history.

(56) References Cited

U.S. PATENT DOCUMENTS

| | | | |
|---|---|---|---|
| 4,274,691 | A | 6/1981 | Abernethy et al. |
| 4,406,509 | A | 9/1983 | Jagen |
| 4,556,264 | A | 12/1985 | Tanaka |

(Continued)

FOREIGN PATENT DOCUMENTS

| | | | |
|---|---|---|---|
| EP | 0 777 304 | A2 | 6/1997 |
| EP | 0 692 884 | B1 | 3/2002 |
| GB | 2 314 466 | A | 12/1997 |
| WO | WO 97/44862 | | 11/1997 |
| WO | WO 00/42682 | | 7/2000 |

OTHER PUBLICATIONS

The Siemon Company Catalog pages–front cover page through p. 139, and back cover page, date 1999.

Panduit Corp., Tinley Park, Illinois, "Panduit® Communication Products", cover page, pp. 40–49, and back page (1996).

Exhibit A: "Complaint," *ADC Telecommunications, Inc.*v. *CommScope Solutions Properties, LLC and CommScope Solutions, Inc.*,District of Minnesota, Civil Action No. 0:05–cv–02584 ADM–JSM, pp. 1–10 (Nov. 7, 2005).

(Continued)

*Primary Examiner*—Hae Moon Hyeon
(74) *Attorney, Agent, or Firm*—Merchant & Gould P.C.

(57) ABSTRACT

The present disclosure relates to an insert for a jack. The insert includes a connector mount having a main body including a first side positioned opposite from a second side. The connector mount also includes a snap-fit connection structure positioned at the main body for securing the connector mount to the jack, a divider positioned at the first side of the main body, and an insulation displacement terminal housing positioned at the first side of the main body. A plurality of contact springs are separated by the divider, and a plurality of insulation displacement terminals are housed by the insulation displacement terminal housing. The insert further includes a circuit board that provides electrical connections between the insulation displacement terminals and the contact springs. The circuit board is mounted at the second side of the main body.

46 Claims, 23 Drawing Sheets

U.S. PATENT DOCUMENTS

| | | | |
|---|---|---|---|
| 4,648,678 | A | 3/1987 | Archer |
| 4,698,025 | A | 10/1987 | Silbernagel et al. |
| 4,971,571 | A | 11/1990 | Puerner |
| 5,030,123 | A | 7/1991 | Silver |
| 5,041,018 | A | 8/1991 | Arnett |
| 5,044,981 | A | 9/1991 | Suffi et al. |
| 5,071,371 | A | 12/1991 | Harwath et al. |
| 5,156,554 | A | 10/1992 | Rudoy et al. |
| 5,186,647 | A | 2/1993 | Denkmann et al. |
| 5,238,426 | A | 8/1993 | Arnett |
| 5,299,956 | A | 4/1994 | Brownell et al. |
| 5,302,140 | A | 4/1994 | Arnett |
| 5,310,363 | A | 5/1994 | Brownell et al. |
| 5,338,231 | A | 8/1994 | Wilhite |
| 5,362,257 | A | 11/1994 | Neal et al. |
| 5,399,107 | A | 3/1995 | Gentry et al. |
| 5,403,200 | A | 4/1995 | Chen |
| 5,474,474 | A | 12/1995 | Siemon et al. |
| 5,478,261 | A | 12/1995 | Bogese, II |
| 5,503,572 | A | 4/1996 | White et al. |
| 5,580,257 | A | 12/1996 | Harwath |
| 5,624,274 | A | 4/1997 | Lin |
| 5,639,261 | A | 6/1997 | Rutkowski et al. |
| 5,639,266 | A | 6/1997 | Patel |
| 5,647,043 | A | 7/1997 | Anderson et al. |
| 5,659,650 | A | 8/1997 | Arnett |
| 5,674,093 | A | 10/1997 | Vaden |
| 5,700,167 | A | 12/1997 | Pharney et al. |
| 5,713,764 | A | 2/1998 | Brunker et al. |
| 5,716,237 | A | 2/1998 | Conorich et al. |
| 5,735,714 | A | 4/1998 | Orlando et al. |
| 5,759,070 | A | 6/1998 | Belopolsky |
| 5,779,503 | A | 7/1998 | Tremblay et al. |
| 5,785,546 | A | 7/1998 | Hamai et al. |
| 5,791,935 | A | 8/1998 | Yamanashi |
| 5,791,943 | A | 8/1998 | Lo et al. |
| 5,795,186 | A | 8/1998 | Tulley et al. |
| 5,885,111 | A | 3/1999 | Yu |
| 5,911,602 | A | 6/1999 | Vaden |
| 5,924,896 | A | 7/1999 | Arnett et al. |
| 5,938,479 | A | 8/1999 | Paulson et al. |
| 5,941,734 | A | 8/1999 | Ikeda et al. |
| 5,947,761 | A | 9/1999 | Pepe |
| 5,947,772 | A | 9/1999 | Arnett et al. |
| 5,997,358 | A | 12/1999 | Adriaenssens et al. ..... 439/676 |
| 6,066,005 | A | 5/2000 | Belopolsky |
| 6,083,052 | A | 7/2000 | Adams et al. |
| 6,086,428 | A | 7/2000 | Pharney et al. |
| 6,089,909 | A | 7/2000 | Tokuwa |
| 6,089,923 | A | 7/2000 | Phommachanh |
| 6,102,722 | A | 8/2000 | Arnett |
| 6,116,964 | A | 9/2000 | Goodrich et al. |
| 6,165,023 | A | 12/2000 | Troutman et al. |
| 6,186,834 | B1 | 2/2001 | Arnett et al. |
| 6,196,880 | B1 | 3/2001 | Goodrich et al. |
| 6,234,836 | B1 | 5/2001 | Schmidt et al. |
| 6,270,358 | B1 | 8/2001 | Nozick |
| 6,283,796 | B1 | 9/2001 | Yeh |
| 6,334,792 | B1 | 1/2002 | Schmidt et al. |
| 6,350,158 | B1 | 2/2002 | Arnett et al. |
| 6,371,793 | B1 | 4/2002 | Doorhy et al. |
| 6,524,131 | B2 | 2/2003 | Schmidt et al. |
| 6,629,862 | B2 | 10/2003 | Schmidt et al. |
| 6,814,624 | B2 | 11/2004 | Clark et al. |

OTHER PUBLICATIONS

Exhibit B: "Answer and Counterclaims," *ADC Telecommunications, Inc.*v. *CommScope Solutions Properties, LLC and CommScope Solutions, Inc.,*District of Minnesota, Civil Action No. 0:05–cv–02584 ADM–JSM, pp. 1–16 (Dec. 29, 2005).

Exhibit C: "ADC's Reply and Counterclaims to Defendants' Counterclaims," *ADC Telecommunications, Inc.*v. *CommScope Solutions Properties, LLC and CommScope Solutions, Inc.,* District of Minnesota, Civil Action No. 0.05–cv–02584 ADM–JSM, pp. 1–10 (Feb. 17, 2006).

Exhibit D: "First Amended Complaint," ADC Telecommunications, Inc. and ADCGMBH v. CommScope Solutions Properties, LLC and CommScope Solutions, Inc., District of Minnesota, Civil Action No. 0:05–cv–02584 ADM–JSM, pp. 1–12 (Apr. 19, 2006).

Exhibit E: "Answer and Counterclaims to First Amended Complaint," *ADC Telecommunications, Inc. and ADC GmbH* v. *CommScope Solutions Properties, LLC and CommScope Solutions, Inc.,*District of Minnesota, Civil Action No. 0:05–cv–02584 ADM–JSM, pp. 1–17 (Apr. 28, 2006).

Exhibit F "EX.3: Commscope's Preliminary Responsive Claim Chart to U.S. Patent No. 6,542,131, " *ADC Telecommunications Inc.* v. *CommScope Solutions Properties, LLC and CommScope Solutions, Inc.,* District of Minnesota, Civil Action No. 05–02584 ADM–JSM, pp. 1–7 (Jul. 18, 2006).

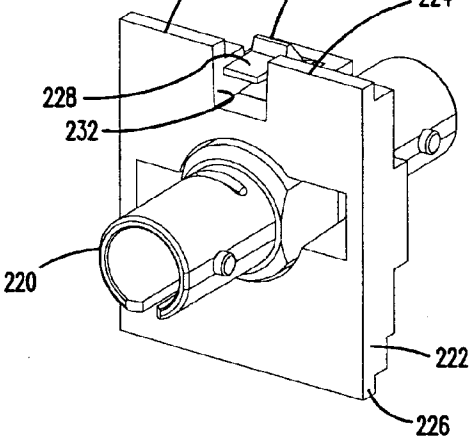
FIG. 12A (AMENDED)

TELECOMMUNICATIONS JACK ASSEMBLY

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation of application Ser. No. 09/327,053, filed Jun. 7, 1999 now U.S. Pat. No. 6,234,836, which is a continuation-in-part of Ser. No. 09/231,736, filed Jan. 15, 1999, which application(s) are incorporated herein by reference *now U.S. Pat. No. 6,334,792*.

FIELD OF THE INVENTION

The present invention relates generally to electrical connectors. More specifically, the present invention relates to electrical connectors such as jacks used in the telecommunications industry.

BACKGROUND OF THE INVENTION

Various electrical/fiberoptic connectors are known for use in the telecommunications industry to transmit voice, data and video signals. A common connector configuration includes a faceplate or outlet that is frequently mounted on a structure such as a wall. The faceplate defines a plurality of openings in which connectors can be mounted. A typical connector includes a modular jack defining a port sized for receiving a conventional 8 position modular plug. Other conventional types of connectors include SC connectors, ST connectors, BNC connectors, F connectors and RCA connectors.

With respect to electrical/fiberoptic connectors for the telecommunications industry, it is important that such connectors be easily installed, easily accessed after being installed and easily repaired. In this regard, it is desirable for the connectors to be front mounted within their corresponding faceplates. By front mounting the connectors, the connectors can be accessed without requiring their corresponding faceplates to be removed from the wall.

SUMMARY OF THE INVENTION

One aspect of the present invention relates to a jack including a jack housing having a front portion positioned opposite from a back portion. The front portion defines an inner chamber and also defines front and rear openings for accessing the inner chamber. The front opening comprises a port sized for receiving a plug. The rear portion of the jack housing defines an open channel that extends in a rearward direction from the front portion. The jack housing also includes a first comb that is secured to the jack housing within the inner chamber.

The jack also includes an insert assembly adapted to be secured to the jack housing. The insert assembly includes a connector mount having a first side positioned opposite from a second side. The connector mount includes two resilient locking tabs for securing the connector mount to the jack housing, a second comb positioned at the first side of the connector mount, and an insulation displacement terminal housing positioned at the first side of the connector mount. The insert assembly also includes a plurality of contact springs, and a plurality of insulation displacement terminals. The contact springs are separated by the second comb. Each of the contact springs includes a base end portion and a free end portion. The plurality of insulation displacement terminals are housed by the insulation displacement terminal housing. The insert assembly further includes a circuit board that provides electrical connections between the insulation displacement terminals and the contact springs. The circuit board is mounted at the second side of the connector mount.

The insert assembly is secured to the jack housing by orienting the insert assembly such that the circuit board is received within the open channel, and then sliding the insert assembly in a forward direction such that: one end of the insert assembly moves into the inner chamber of the jack housing through the rear opening of the jack housing; the locking tabs interlock with the jack housing; and the free end portions of the contact springs are received in the first comb.

Another aspect of the present invention relates to an insert for a jack. The insert includes a connector mount having a main body including a first side positioned opposite from a second side. The connector mount includes a snap-fit structure positioned at the main body for securing the connector mount to the jack. The connector mount also includes a divider positioned at the first side of the main body, and an insulation displacement terminal housing positioned at the first side of the main body. A plurality of contact springs are separated by the divider, and a plurality of insulation displacement terminals are housed by the insulation displacement terminal housing. A circuit board provides electrical connections between the insulation displacement terminals and the contact springs. The circuit board is mounted at the second side of the main body.

A further aspect of the present invention relates to a jack for use with a faceplate having a front side positioned opposite from a back side. The faceplate defines an array of jack openings. The jack includes a jack housing adapted to be mounted within a first one of the jack openings defined by the faceplate. The jack housing is sized and shaped to be inserted into the first jack opening from the front side of the faceplate. The jack housing includes a first retaining structure positioned opposite from a second retaining structure. The first and second retaining structures are positioned to engage the front side of the faceplate when the jack housing is mounted in the first jack opening. At least one of the first and second retaining structures includes spaced-apart retaining shoulders separated by a gap. Each of the retaining shoulders has a width $w_s$ that is larger than a width $w_g$ of the gap located between the retaining shoulders. The jack also includes a resilient cantilever member having a base end positioned opposite from a free end. The base end is integrally connected with the jack housing and the free end is positioned generally within the gap between the spaced-apart retaining shoulders. The cantilever member includes a retaining tab positioned near the free end of the cantilever member. The retaining tab is positioned to engage the back side of the faceplate when the jack housing is mounted in the first jack opening such that the faceplate is captured between the retaining shoulder and the retaining tab. The cantilever member has a width $w_c$ defined at the base end of the cantilever member. The total width $w_s$ of the jack housing is at least two times as large as the width $w_c$.

Still another aspect of the present invention relates to a jack including a resilient cantilever member for retaining the jack within an opening of a faceplate. The resilient cantilever member includes a main body and wings that project transversely outward from opposite sides of the main body. The jack also includes deflection limiting surfaces positioned to engage the wings when the cantilever member has been deflected a first amount. Contact between the wings and the deflection limiting surfaces prevents the cantilever member from being overdeflected.

An additional aspect of the present invention relates to a jack including a jack housing defining a port sized for receiving a plug. The jack also includes a plurality of contact springs positioned within the housing. The contact springs include base end portions and free end portions. The jack further includes two separate and opposing comb structures for isolating the free end portions of the springs from one another. The opposing comb structures are relatively aligned so as to generally form closed ended slots in which the free end portions of the contact springs are received.

BRIEF DESCRIPTION OF THE DRAWINGS

FIGS. 12A–12E illustrate various views of a straight ST-type connector mounted on a support structure adapted to snap-fit within the faceplate shown in FIGS. 1A and 1B;

DETAILED DESCRIPTION OF THE PREFERRED EMBODIMENT

Figure 1A:
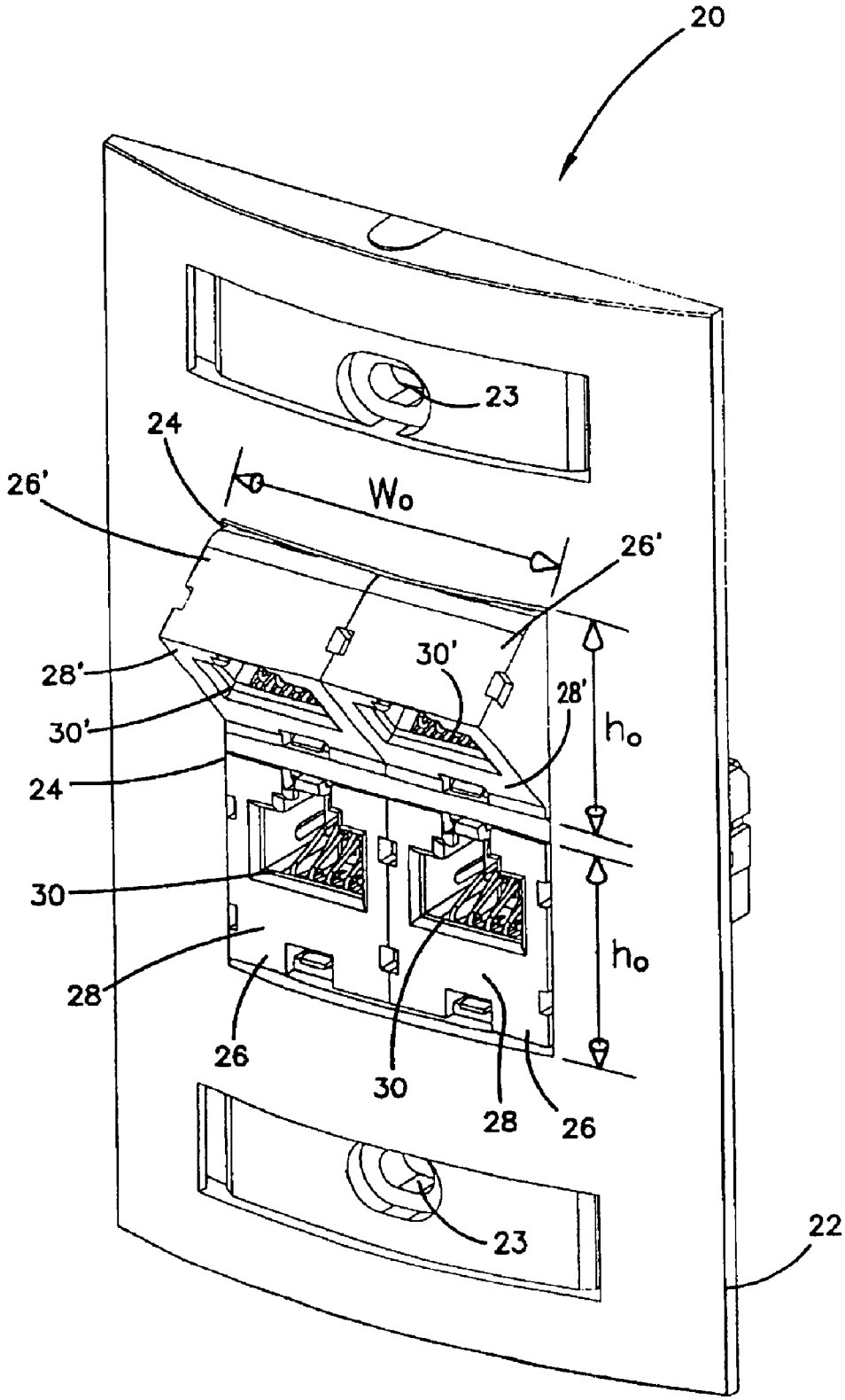
FIG. 1A is a front, perspective view of a jack assembly constructed in accordance with the principles of the present invention.
Figure 1B:
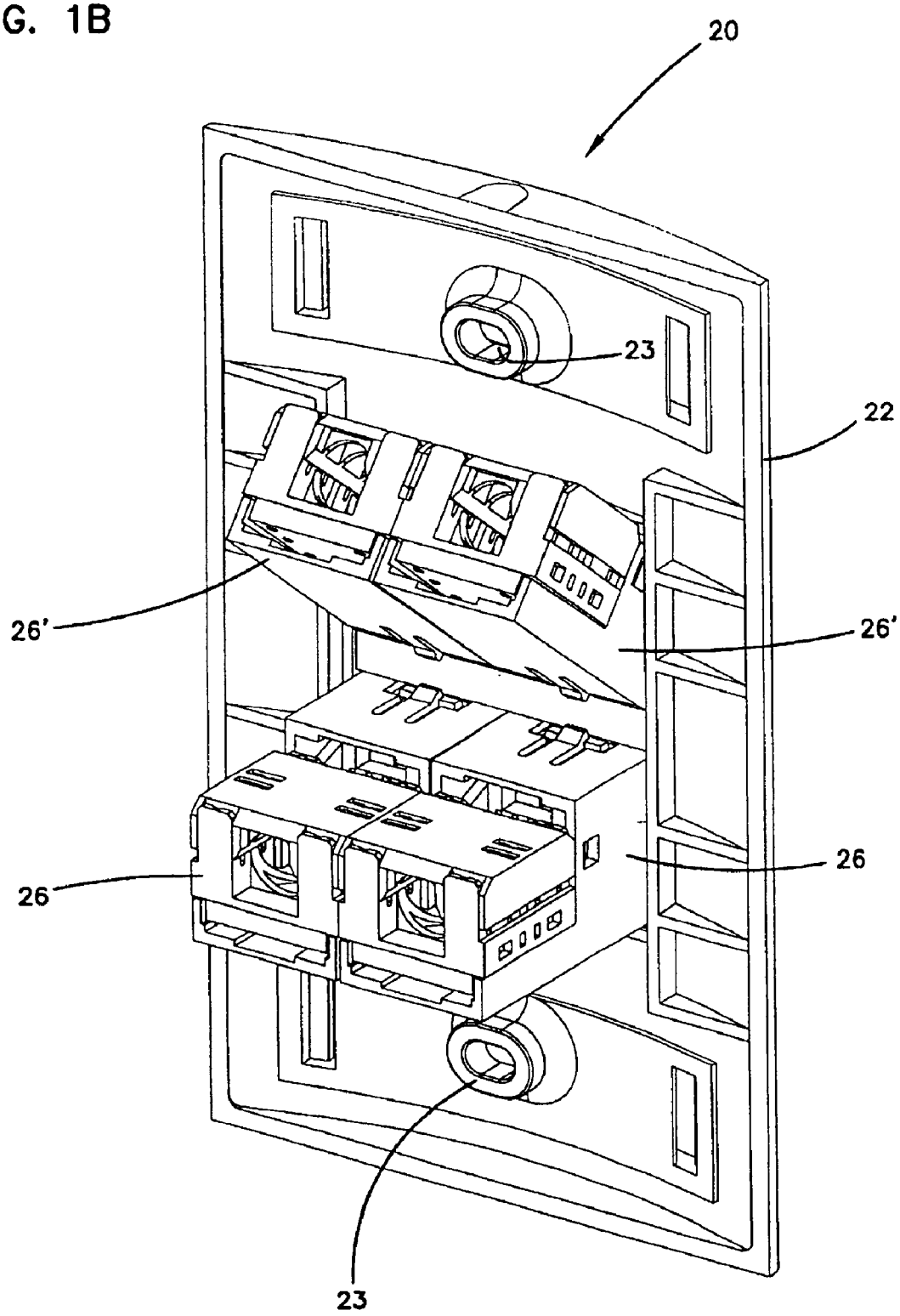
FIG. 1B is a rear, perspective view of the jack assembly of FIG. 1A.

FIGS. 1A and 1B show an example of a jack assembly 20 constructed in accordance with the principles of the present invention. The jack assembly 20 includes a faceplate 22 adapted to be fastened to a structure such as wall. For example, the faceplate 22 includes openings 23 for allowing the faceplate 23 to be bolted, screwed or otherwise connected to the wall. FIG. 1A shows a front side of the faceplate 22 adapted to face away from the wall, and FIG. 1B shows a back side of the faceplate 22 adapted to face toward the wall. Referring to FIG. 1A, the faceplate 22 defines two rectangular openings 24 positioned one above the other. Each of the openings 24 has a height $h_o$ and a width $w_o$.

Figure 2:
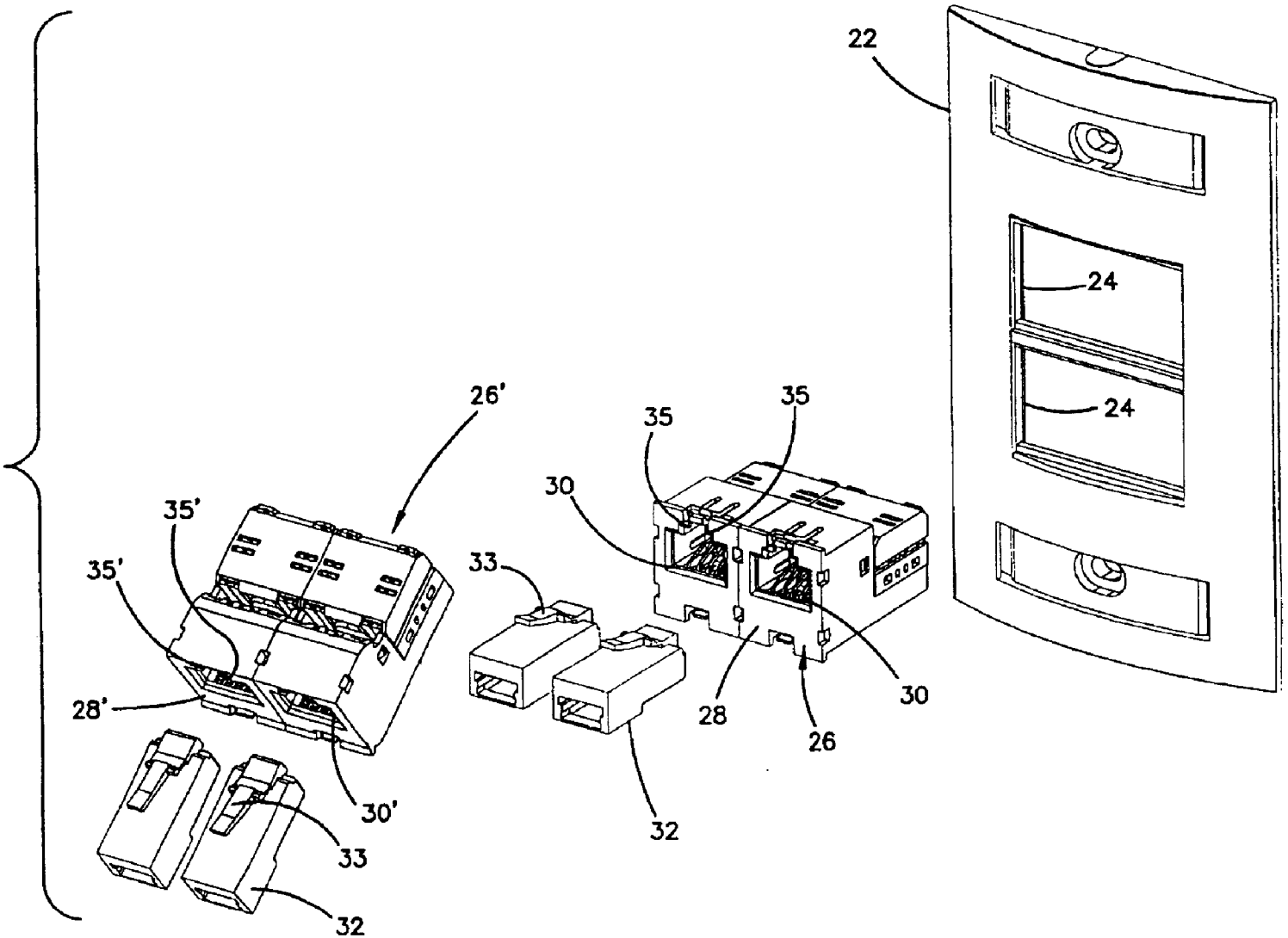
FIG. 2 is an exploded view of the jack assembly of FIGS. 1A and 1B.

Referring still to FIGS. 1A and 1B, two modular jacks are shown mounted in each of the openings 24 of the faceplate 22. For example, two straight jacks 26 are shown mounted in the lower opening 24, and two angled jacks 26' are shown mounted in the upper opening 24. The jacks 26, 26' include front faces 28, 28' that define ports 30, 30' each sized for receiving a plug 32 (shown in FIG. 2). A plurality of contact springs are positioned within each of the ports 30, 30'. The plugs 32 include resilient latches 33. When the plugs 32 are inserted in the ports 30, 30', the latches 33 interlock with front tabs 35, 35' of the jacks 26, 26' to retain the plugs 32 within the ports 30, 30'. To remove the plugs 32, the latches 33 are depressed thereby allowing the plugs 32 to be pulled from the ports 30, 30'.

As shown in the illustrated preferred embodiment, the jacks 26, 26' and the plugs 32 are eight contact type (i.e., four twisted pair) connectors. While the various aspects of the present invention are particularly useful for modular connectors, it will be appreciated that other types of connectors could also be used.

Figure 3:
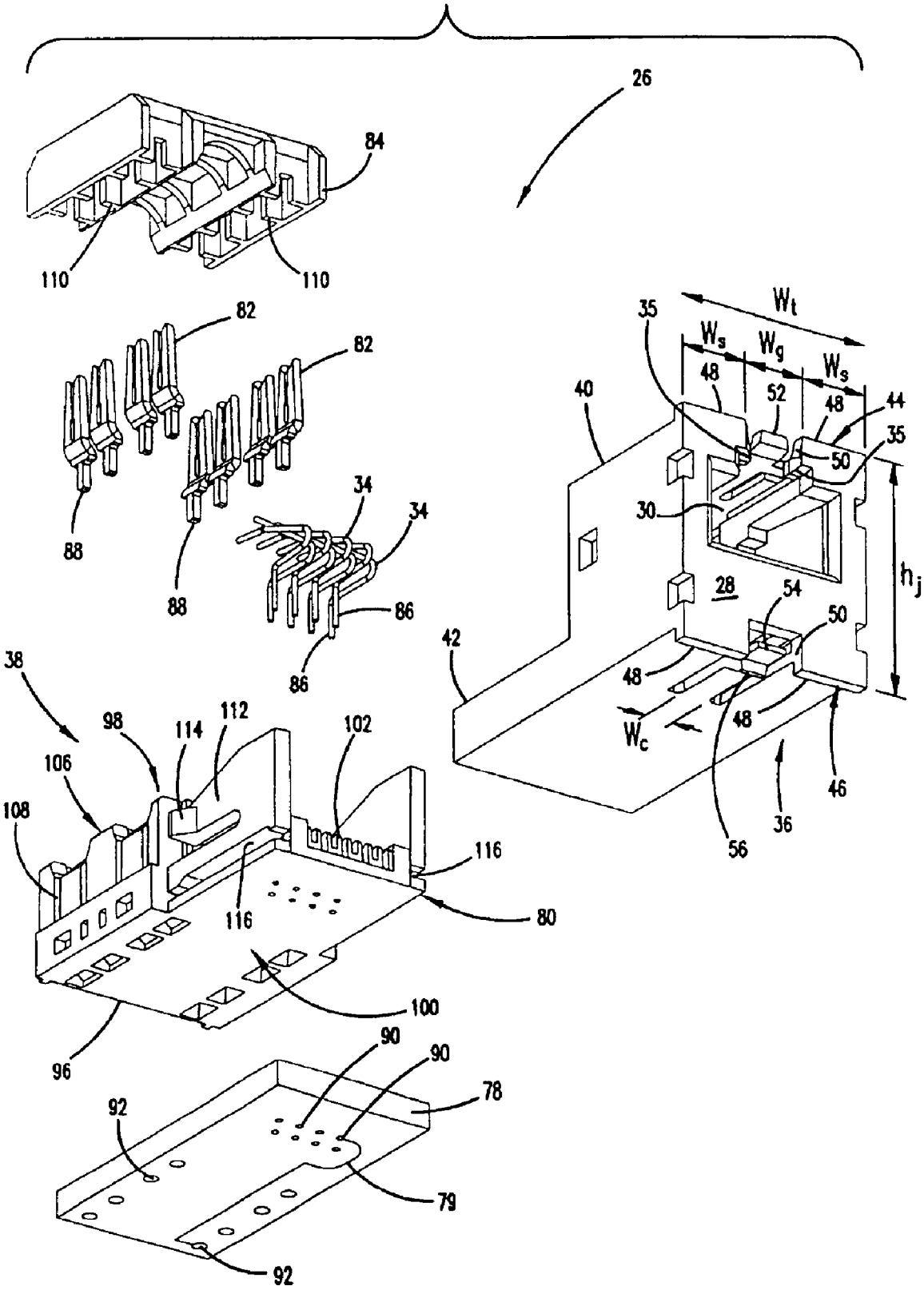
FIG. 3 is an exploded perspective view of one of the straight jacks used by the jack assembly of FIGS. 1A and 1B.
Figure 4:
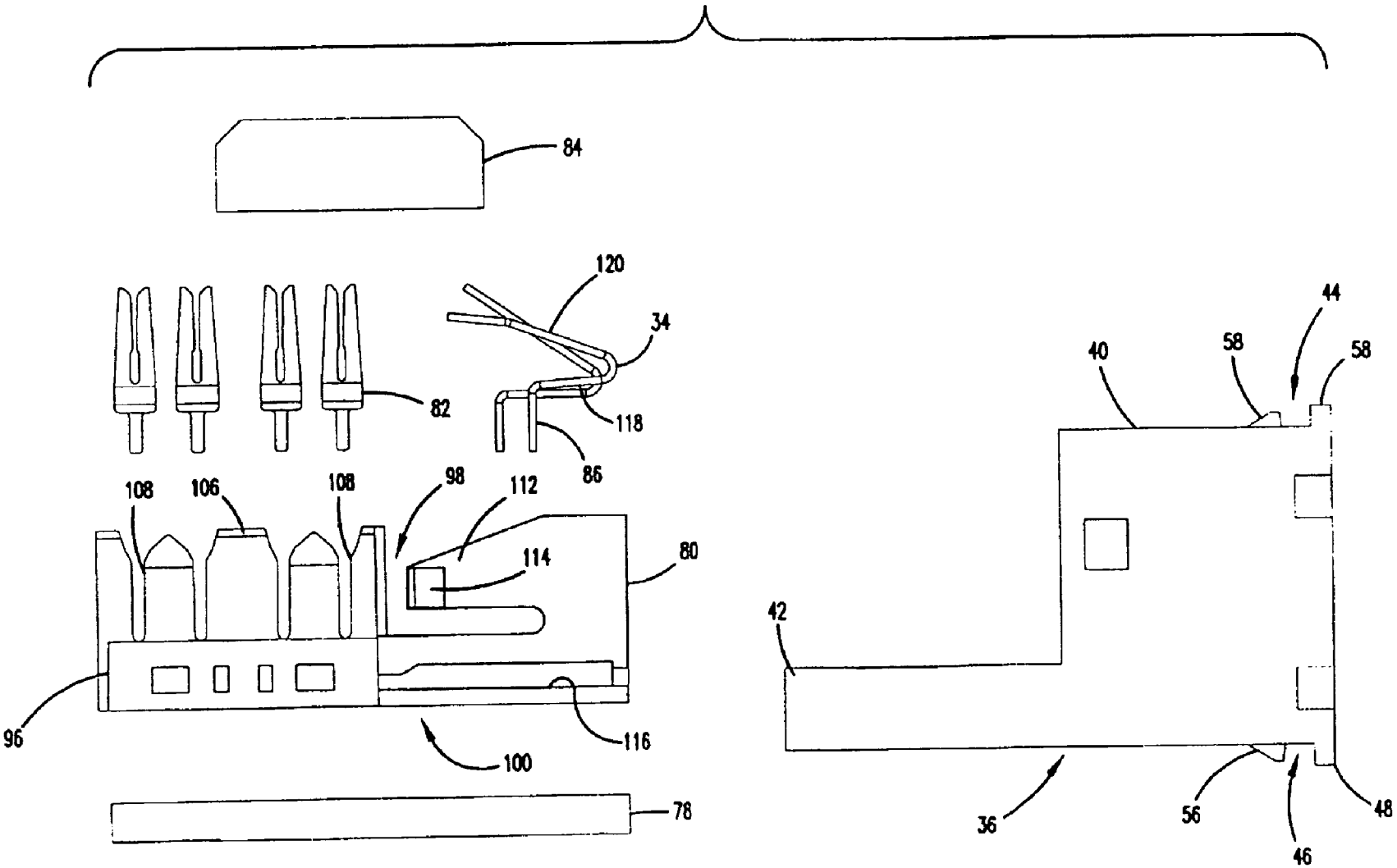
FIG. 4 is an exploded, side view of the straight jack of FIG. 3.
Figure 7A:
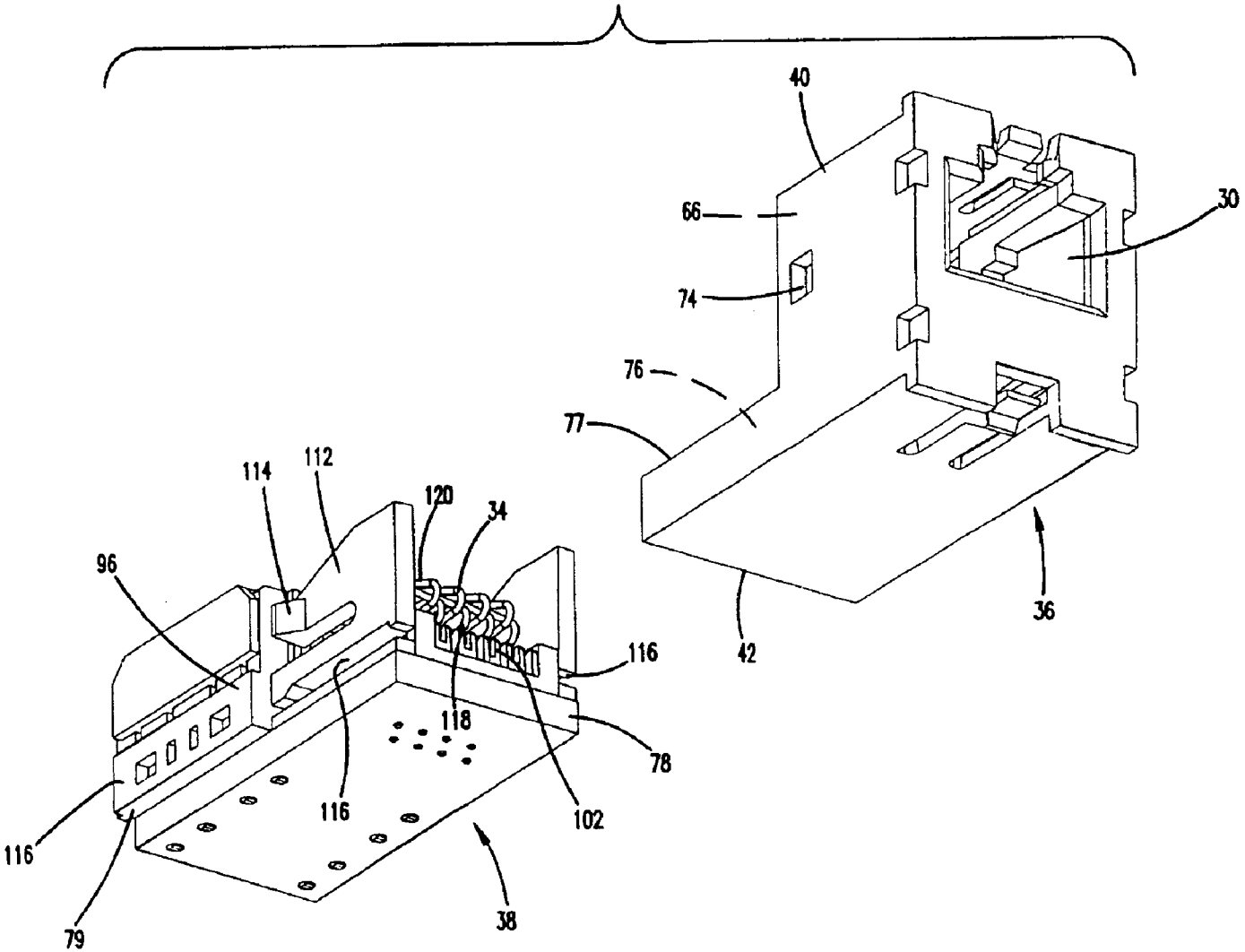
FIG. 7A is a perspective view of the straight jack of FIGS. 3 and 4 with the jack insert fully assembled and aligned with the jack housing.

Referring to FIGS. 3, 4 and 7A, one of the straight jacks 26 is shown. Generally, the straight jack 26 includes two basic components: a front jack housing 36; and a rear insert assembly 38. The jack housing 36 is adapted to be snap-fit into one of the openings 24 of the faceplate 22. The insert assembly 38 is adapted to be snap-fit within the jack housing 36. To mount the jack 26 in the faceplate 22, the insert assembly 38 is first connected to the jack housing 36, and then the jack 26 is inserted from the front side of the faceplate 22 into one of the openings 24.

The jack housing 36 includes a front portion 40 positioned opposite from a back portion 42. The front portion 40 of the jack housing 36 includes structure for securing the jack 26 in the faceplate 22. For example, the front portion 40 includes a first retaining structure 44 positioned opposite from a second retaining structure 46. Each of the retaining structures 44, 46 includes spaced-apart retaining lips/shoulders 48 separated by a gap 50. Each of the retaining shoulders 48 preferably has a width $w_s$, and each of the gaps preferably has a width $w_g$. It is preferred for each of the widths $w_g$ to be equal to or less than each of the widths $w_s$. The widths $w_s$ and $w_g$ cooperate to define a total width $w_s$ of the jack housing 36. The jack housing 36 also preferably includes a height $h_j$ defined between the first and second retaining structures 44 and 46. It is preferred for the height $h_j$ to be larger than the height $h_o$ of the openings 24 defined by the faceplate 22.

Referring to FIG. 3, the first retaining structure 44 includes a first resilient cantilever member 52 positioned between the retaining shoulders 48 of the first retaining structure 44. Similarly, the second retaining structure 46 includes a resilient cantilever member 54 positioned between the retaining shoulders 48 of the second retaining structure 46. Each of the cantilever members 52, 54 includes a base end integrally formed with the jack housing 36, and a free end positioned adjacent to the front face 28 of the jack 26. Preferably, the free ends of the cantilever members 52, 54 are flush or slightly recessed with respect to the front face 28. Each of the cantilever members 52 and 54 also preferably has a width $w_c$ measured at the base ends of the cantilever members 52, 54. Preferably, the total width $W_t$ of the jack 26 is at least two times as large as the width $w_c$. Such a size relationship assists in insuring that the cantilever members 52, 54 can be easily flexed.

As shown in FIG. 3, the resilient cantilever member 54 includes a rear tab 56 adapted for engaging the back side of the faceplate 22. Similarly, referring to FIG. 5, the resilient cantilever member 52 also includes a rear tab 58 for engaging the back side of the faceplate 22. The cantilever member 52 further includes a front tab 60 for engaging the front side of the faceplate 22. Additionally, it is noted that the cantilever member 52 at least partially defines a portion of the port 30 of the jack 26. As a result, no portion of the jack housing 36 is provided for preventing the cantilever member 52 from being overflexed. To overcome this problem, the cantilever member 52 includes a pair of wings 62 (shown in FIG. 5) that project transversely outward from a main body of the cantilever member 52. The wings 62 are positioned above recessed deflection limiting surfaces 64 formed on the jack housing 36. When the cantilever member 52 has been flexed downward a predetermined amount, the wings 62 engage the deflection limiting surfaces 64 to prevent the cantilever member 52 from being overflexed.

Figure 8:
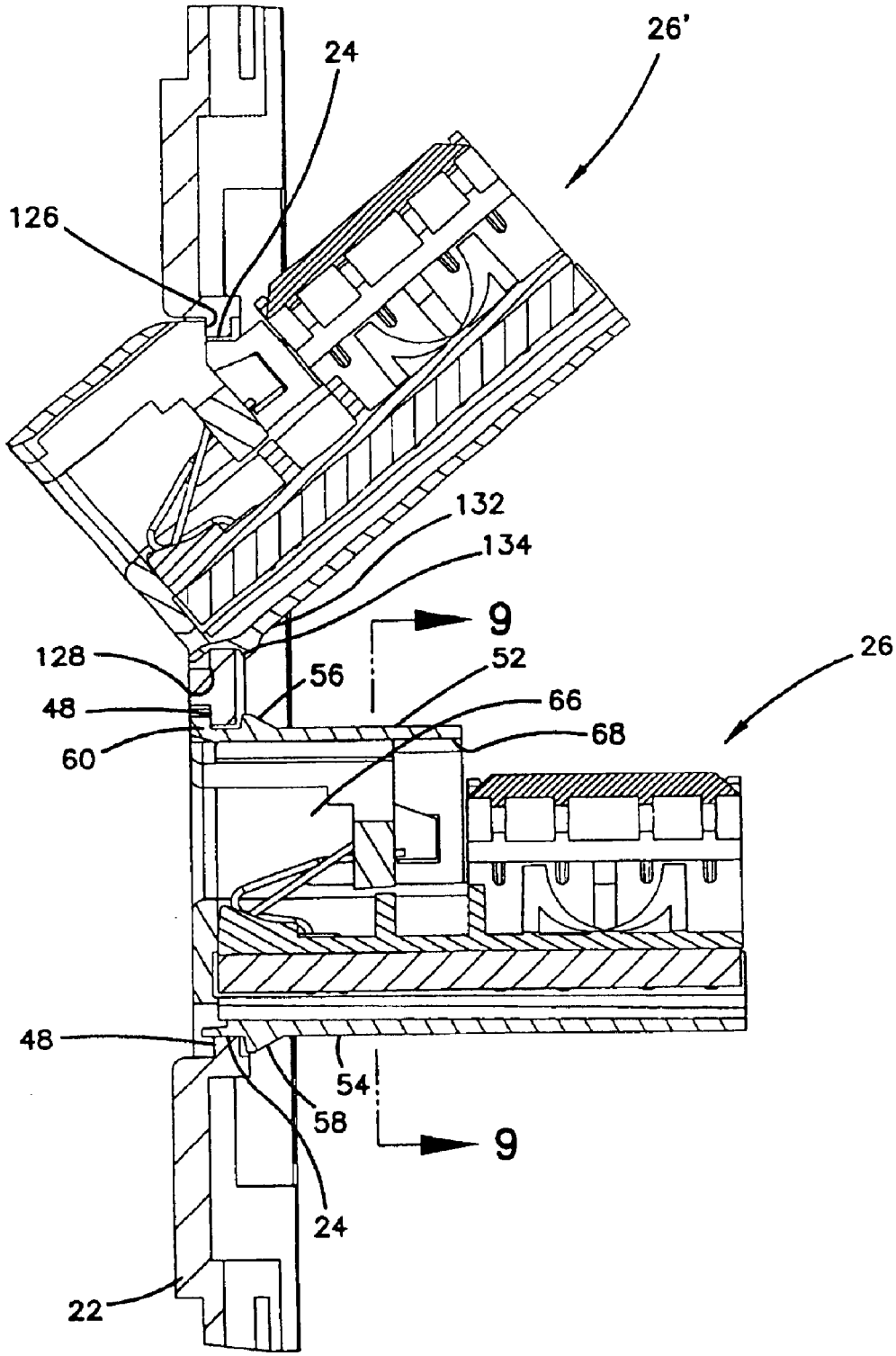
FIG. 8 is a cross-sectional view that vertically bisects two of the jacks of FIGS. 1A and 1B.

FIG. 8 shows the jack 26 snap-fitted within the lower opening 24 of the faceplate 22. As shown in FIG. 8, the upper and lower sets of retaining shoulders 48 engage the front side of the faceplate 22 to prevent the jack housing 36 from being pushed completely through the opening 24. Similarly, the front tab 60 of the cantilever member 52 also engages the front side of the faceplate 22. The rear tabs 56, 58 of the cantilever members 52, 54 engage the back side of the faceplate 22 to prevent the jack 26 from dislodging from the opening 24. To mount the jack 26 within the opening 24, the rear portion of the jack is inserted into the opening 24. As the jack 26 is pushed into the opening 24, ramped surfaces of the rear tabs 56, 58 cause the cantilever members 52, 54 to flex inward until the rear tabs 56, 58 pass through the opening 24. Once the rear tabs 56, 58 have passed through the opening 24, the cantilever members 52, 54 snap outward thereby bringing the rear tabs 56, 58 into engagement or opposition with the back side of the faceplate 22. The entire jack 26 can be removed from the faceplate 22 by flexing the cantilever members 52, 54 inward, and concurrently pulling the jack 26 from the opening 24.

Referring again to FIG. 5, the front portion 40 of the jack housing 36 defines a inner chamber 66 for housing the contact springs 34. The inner chamber 66 can be accessed through the front of the jack housing 36 via the port 30, and also defines a rear opening 68 for allowing at least a portion of the insert assembly 38 to be inserted into the inner chamber 66. Still referring to FIG. 5, a comb 70 is secured to the jack housing 36 within the inner chamber 66. The comb 70 includes a plurality of dividers defining a plurality of slots. The slots are sized for receiving portions of the contact springs 34 such that the contact springs 34 are separated from one another. Guide rails 72 are positioned on opposite sides of the comb 70. The guide rails 72 project into the inner chamber 66 from sidewalls of the jack housing 36. The guide rails 72 each have a tapered vertical thickness such that the guide rails 72 are thicker adjacent the front side of the inner chamber 66 as compared to the rear side of the inner chamber 66. Latch openings 74 are defined by the sidewalls of the jack housing 36 at locations above the guide rails 72.

Figure 5:
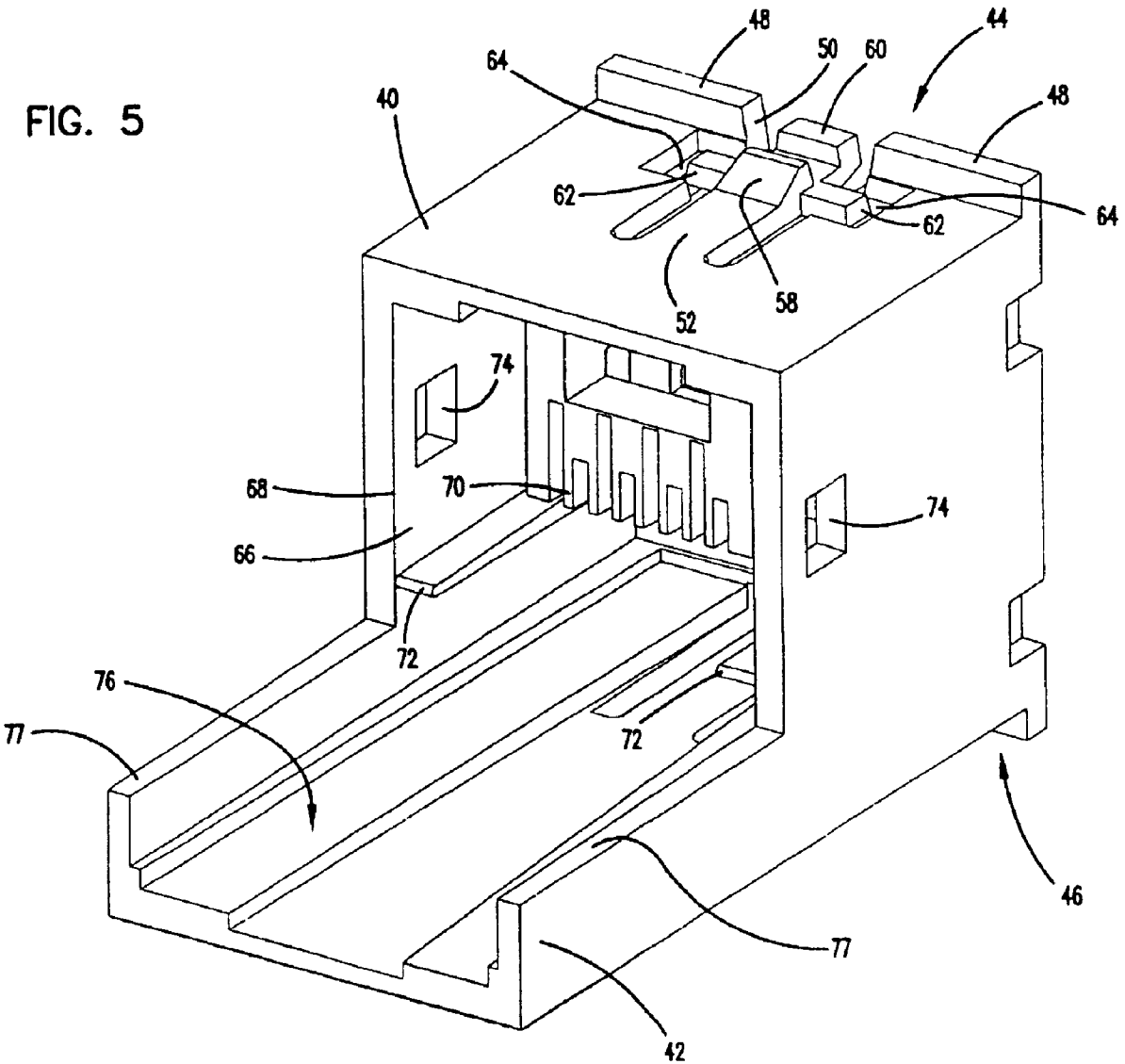
FIG. 5 is a rear, perspective view of a jack housing used by the straight jack of FIGS. 3 and 4.

Referring still to FIG. 5, the back portion 42 of the jack housing 36 defines an open channel or trough 76 that extends in a rearward direction from the front portion 40. The trough 76 is preferably sized to receive and support the insert assembly 38 when the insert assembly is connected to the jack housing 36.

As shown in FIGS. 3 and 4, the insert assembly 38 includes a printed circuit board 78, a connector mount 80, the contact springs 34, a plurality of insulation displacement terminals 82, and a termination cap 84. The contact springs 34 and the insulation displacement terminals 82 respectively include board contact portions 86, 88 that extend through the connector mount 80 and engage respective contact locations 90, 92 (e.g., plated through-holes) located on the printed circuit board 78. The printed circuit board 78 includes a plurality of tracings 79 (only a representative one is shown) that electrically connect the contact locations 90 to the contact locations 92. In this manner, the printed circuit board 78 provides electrical connections between the contact springs 34 and the insulation displacement terminals 82.

Figure 6:
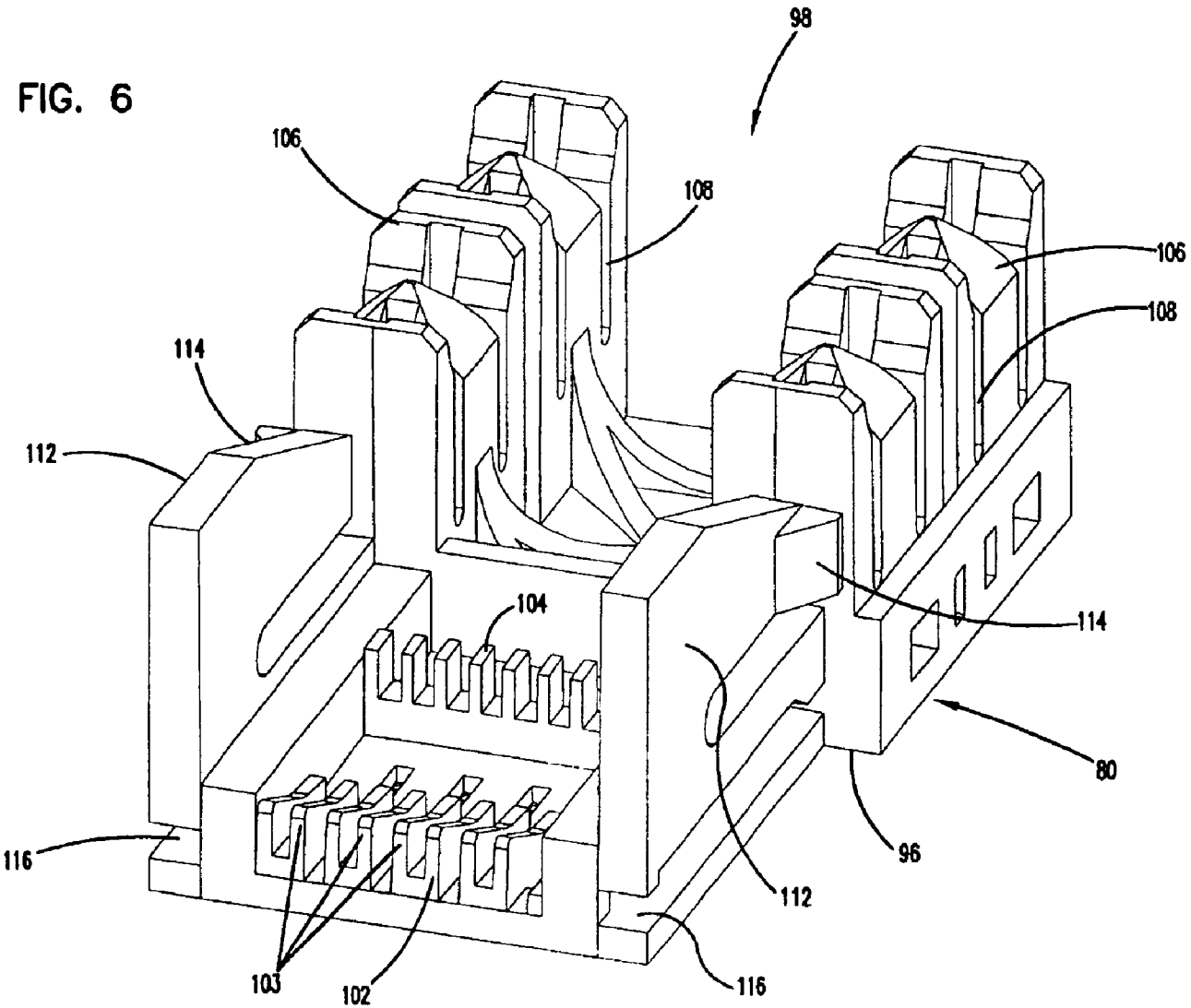
FIG. 6 is a perspective view of a connector mount used by the straight jack of FIGS. 3 and 4.

The connector mount 80 preferably comprises a one-piece, plastic member having a main body 96 including a first side 98 positioned opposite from a second side 100. The printed circuit board 78 is mounted at the second side 100 of the main body 96. The first side 98 of the main body 96 is configured for holding or retaining the contact springs 34 and the insulation displacement terminals 82. For example, the first side 98 of the main body 96 includes two combs 102, 104 (shown in FIG. 6) for receiving and separating the contact springs 34. Each of the combs 102, 104 includes a plurality of dividers 103 defining slots sized for receiving the contact springs 34.

The first side 98 of the main body 96 also includes an insulation displacement terminal housing 106. The insulation displacement terminal housing 106 defines a plurality of slots 108 in which the insulation displacement terminals 82 are mounted. The slots 108 are sized to receive wires (not shown) desired to be terminated at the insert assembly 38. The termination cap 84 is configured for pressing the wires (not shown) into the slots 108 such that the wires are connected to the insulation displacement terminals 82. For example, the termination cap 84 includes a plurality of slotted walls 110 that fit within the slots 108 when the termination cap 84 is pressed down against the insulation displacement terminal housing 106.

The connector mount 80 also includes two resilient locking tabs 112 integrally connected to the main body 96 for securing the insert assembly 38 to the jack housing 36. The resilient locking tabs 112 include flexible lever members 114 positioned on opposite sides of the combs 102, 104. The locking tabs 112 are configured to snap within the latch openings 74 defined by the jack housing 36 to provide a snap-fit connection between the insert assembly 38 and the jack housing 36. While the lever members 114 are shown connected to the main body 96 of the connector mount 80, it will be appreciated that alternative snap-fit connecting structures could also be used. For example, the connector mount 80 could include holes, projections, or latches adapted to interlock with resilient tabs connected to the jack housing 36.

To provide precise alignment between the insert assembly 38 and the jack housing 36, the main body 96 of the connector mount 80 defines two slots 116 sized and positioned for receiving the guide rails 72 of the jack housing 36. The slots 116 are formed within sidewalls of the main body 96 and are positioned on opposite sides of the combs 102, 104. Inner ends of the slots 116 are ramped to further enhance alignment between the jack housing 36 and the insert assembly 38.

Referring to FIG. 4, the contact springs 34 each preferably includes a base portion 118 and a free end portion 120. When the contact springs 34 are mounted on the connector mount 80, the base portions 118 fit within the slots defined by the comb 102, and the free end portions 120 are aligned above the slots defined by the comb 104. Preferably, as shown in FIG. 4, adjacent springs 34 have non-parallel relationships with respect to one another to minimize crosstalk. A more detailed description relating to the spring configuration is provided by U.S. patent application Ser. No. 09/231,736, filed Jan. 15, 1999, which is hereby incorporated by reference.

Figure 7B:
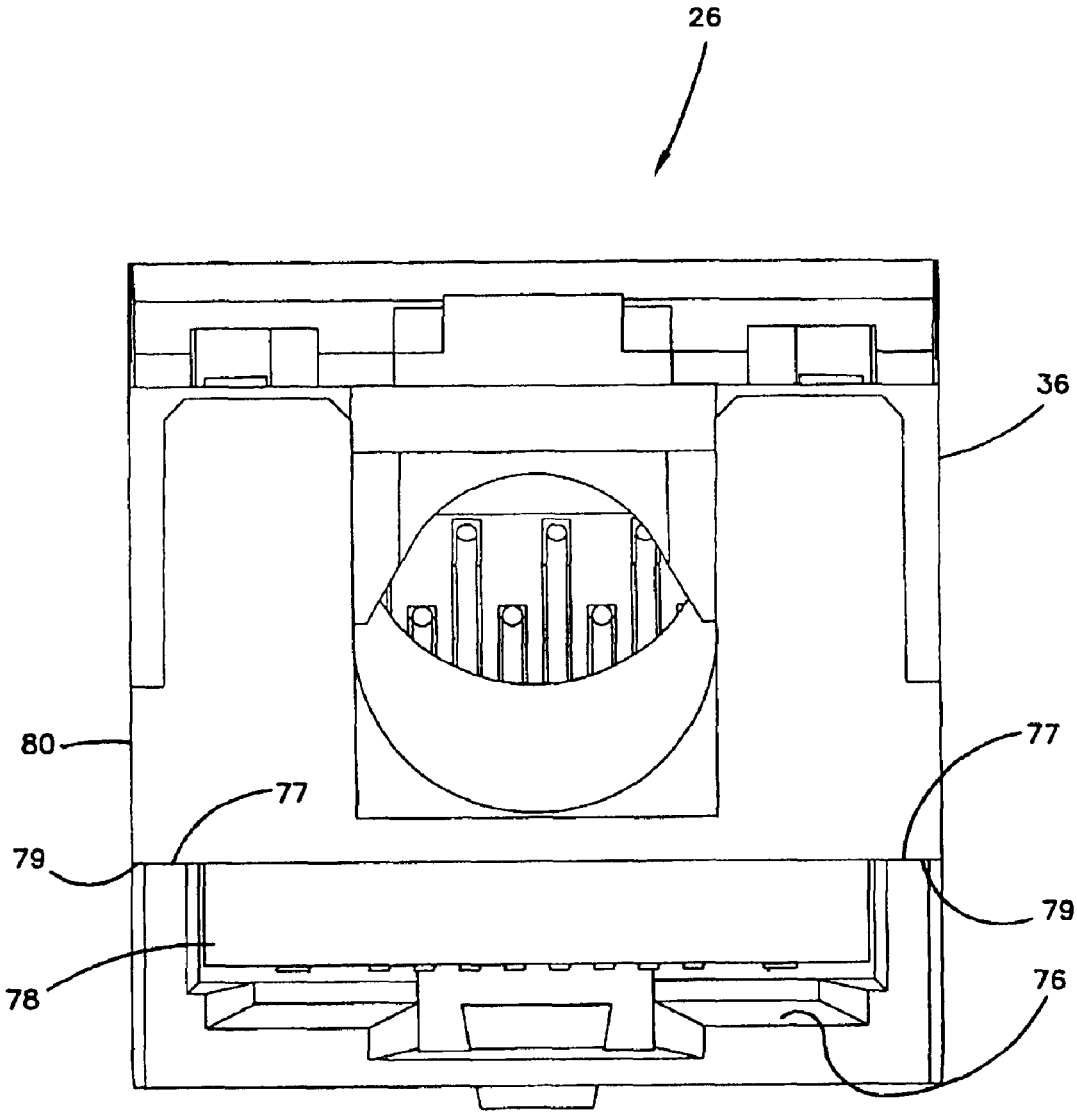
FIG. 7B is a rear view of the straight jack of FIGS. 3 and 4 with the assembled jack insert inserted within the jack housing.

To connect the insert assembly 38 to the jack housing 36, the assembled insert assembly 38 (shown in FIG. 7A) is placed within the trough 76 of the jack housing 36. For example, as shown in FIG. 7B, the insert assembly is positioned such that the circuit board 78 is received in the trough 76, and the main body 96 of the connector mount 80 is supported by side walls 77 of the trough 76 (e.g., shoulders 79 of the main body 96 seat upon the tops of the side walls 77). As so positioned, the printed circuit board 78 is vertically offset from the bed of the trough 76.

Next, the insert assembly 38 is moved along the trough 76 in a forward direction such that a front end of the insert assembly 38 (e.g. the end at which the contact springs 34 are mounted) moves into the inner chamber 66 of the jack housing 36 through the rear opening 68 of the jack housing 36. As the front end of the insert assembly 38 enters the inner chamber 66, the guide rails 72 of the jack housing 36 are received within the guide slots 116 defined by the connector mount 80. Also, the free end portions 120 of the contact springs 34 are received within the slots defined by the comb 70 located within the inner chamber 66. When the insert assembly 38 has been fully inserted within the inner chamber 66, the locking tabs 112 of the connector mount 80 snap within the latch openings 74 of the jack housing 36. To remove the insert assembly 38 from the jack housing 36, the locking tabs 112 can be depressed thereby allowing the insert assembly 38 to be pulled from the jack housing 36.

It is significant that the guide rails 72 and the guide slots 116 provide for precise positioning of the connector mount 80 within the jack housing 36. For example, the guide slots 166 and the guide rails 72 are configured to orient the connector mount 80 at a precise vertical and horizontal position relative to the comb 70. At such a position, the springs 34 are received within the comb 70, and the printed circuit board 78 is preferably offset from or held above the bed of the trough 76. Because the board 78 is offset from the trough 76, printed circuit boards having different thicknesses can be used without affecting the alignment of the connector mount 80 within the jack housing 36. As a result, the alignment of the connector mount 80 within the jack housing 36 is not dependent upon the thickness of the circuit board 78. Therefore, the rail and slot configuration eliminates variations in spring deflection and the resulting contact forces caused by tolerance variations in the thickness of the printed circuit boards.

Figure 9:
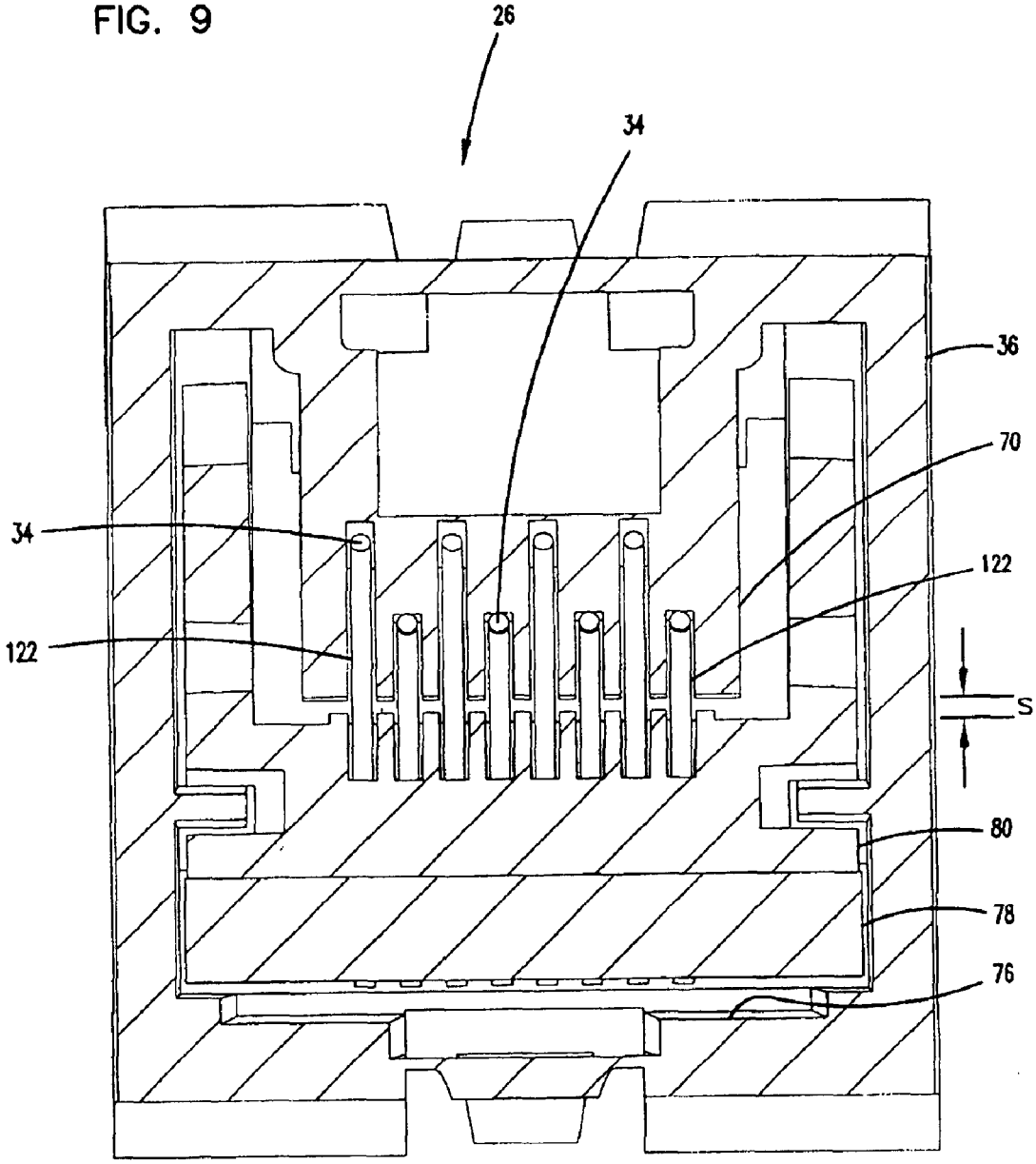
FIG. 9 is a cross-sectional view taken along section line 9—9 of FIG. 8.

FIG. 9 is a cross-sectional view taken along section line 9—9 of FIG. 8. As shown in FIG. 9, when the insert assembly 38 is fully inserted within the jack housing 36, the comb 70 secured with in the jack housing 36 and the comb 104 connected to the connector mount 80 oppose one another and are aligned generally along a common vertical plane. As a result, the combs 70 and 104 cooperate to form closed ended slots 122 in which the free end portions 120 of the contact springs 34 are received. Vertical spacing s between the combs 70 and 104 is preferably sufficiently small to prevent the free end portions 120 of the springs 34 from becoming displaced from the slots 122. In this manner, the free end portions 120 of the springs 34 are captured between the two separate combs 70 and 104.

The spring alignment feature provided by the combs 70 and 104 is important because the contact springs 34 typically have a center to center spacing of about 0.050 inches. When a plug is inserted into the port 30, the plug engages the springs 34 causing the springs to deflect downwardly out of the comb 70. Absent the two cooperating combs 70 and 104, the springs can become misaligned and pushed into contact with one other during deflection. This is not surprising due to the relatively close spacing of the springs 34. However, by capturing the springs 34 between the two combs 70 and 104 as described above, such misalignment is prevented because the springs 34 always remain within their respective closed ended slots 122 during deflection.

Figure 10:
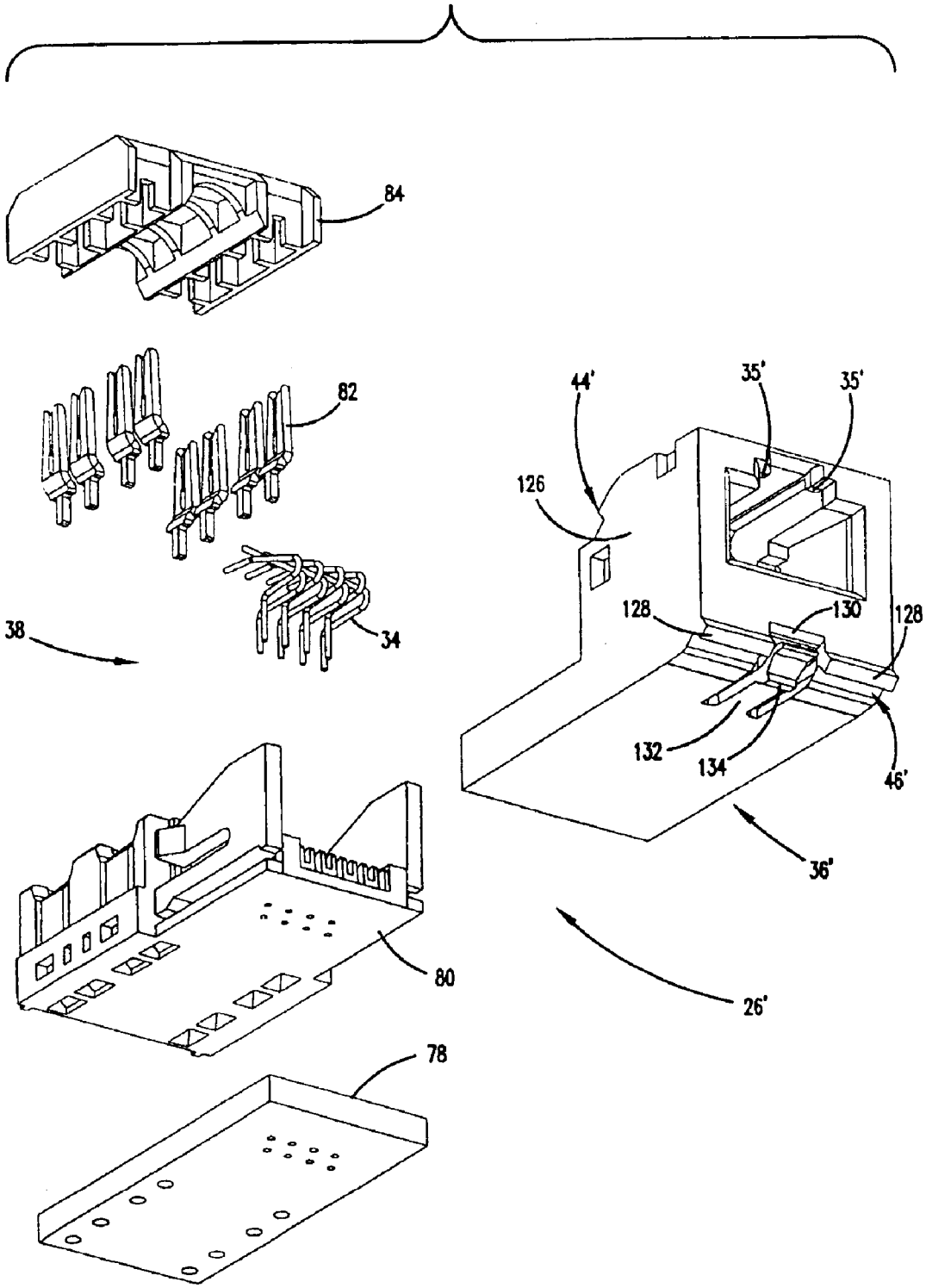
FIG. 10 is an exploded, perspective view of one of the angled jacks of FIGS. 1A and 1B.
Figure 11:
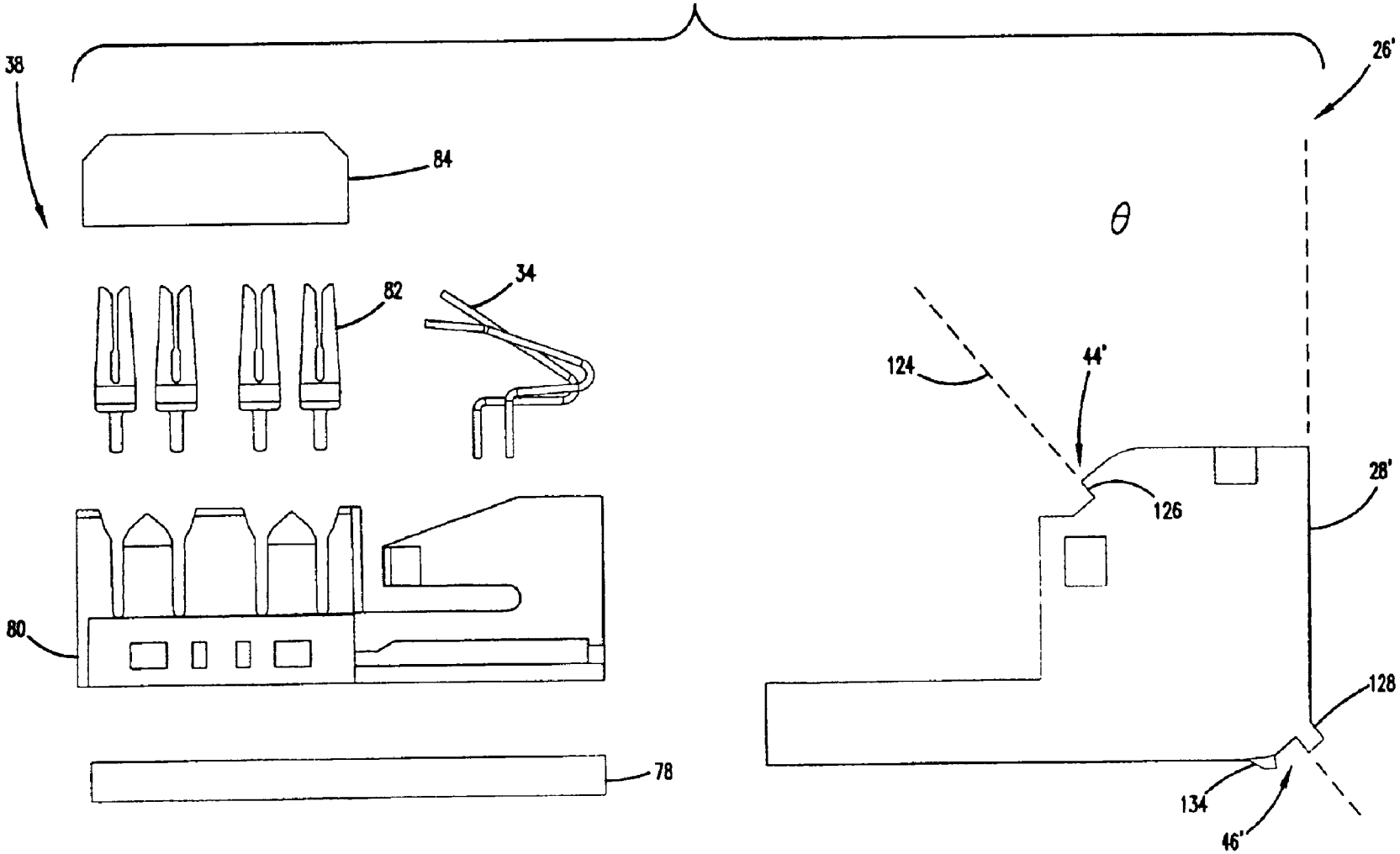
FIG. 11 is an exploded, side view of the angled jack of FIG. 10.
Figure 12B:
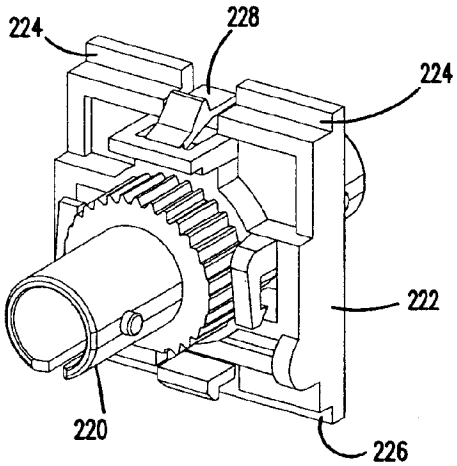
Figure 12E:
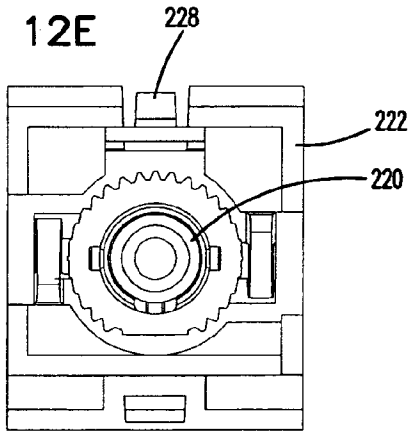
Figure 12D:
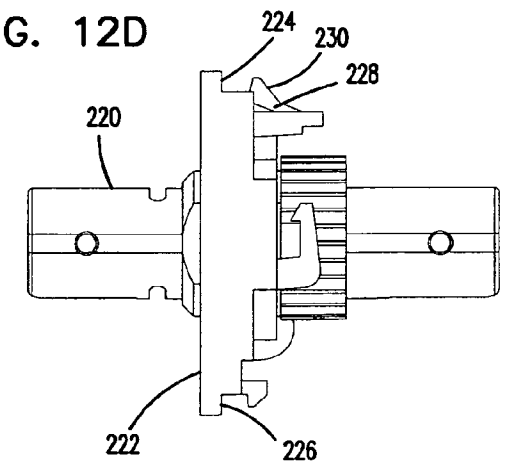
Figure 12C:
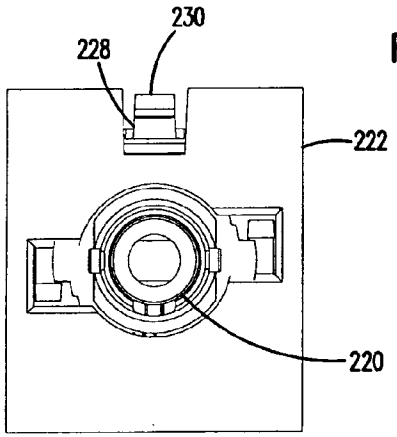
Figure 13B:
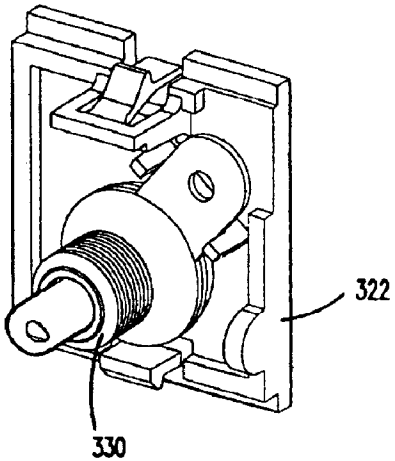
FIGS. 13A–13E illustrate various views of a straight RCA-type connector mounted on a support structure adapted to snap-fit within the faceplate of FIGS. 1A and 1B.
Figure 13A:
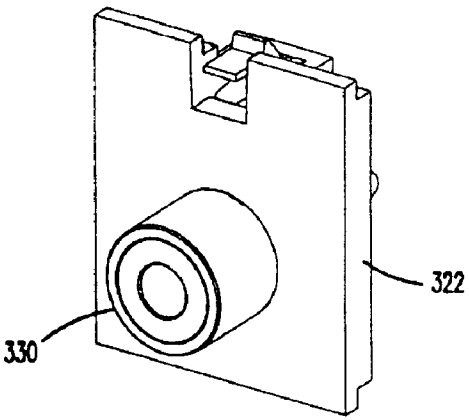
Figure 13E:
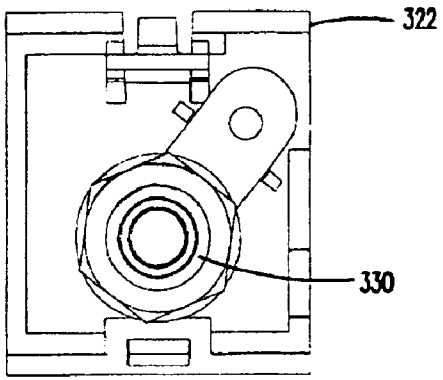
Figure 13D:
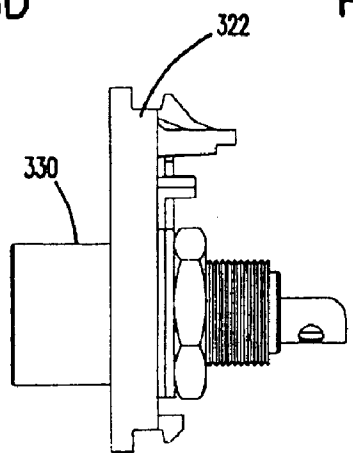
Figure 13C:
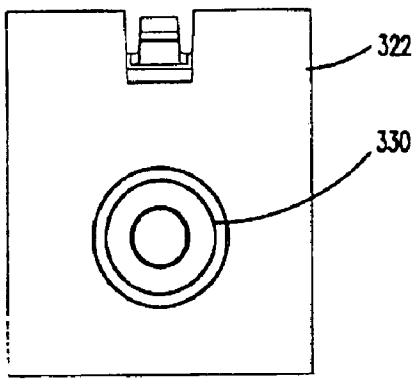
Figure 14B:
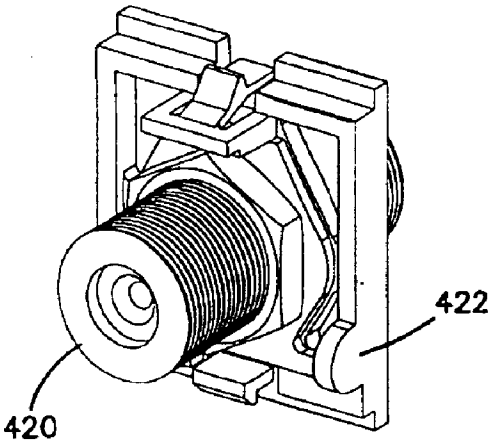
FIGS. 14A–14E illustrate various views of a straight F-type connector mounted on a support structure adapted to snap-fit within the faceplate of FIGS. 1A and 1B.
Figure 14A:
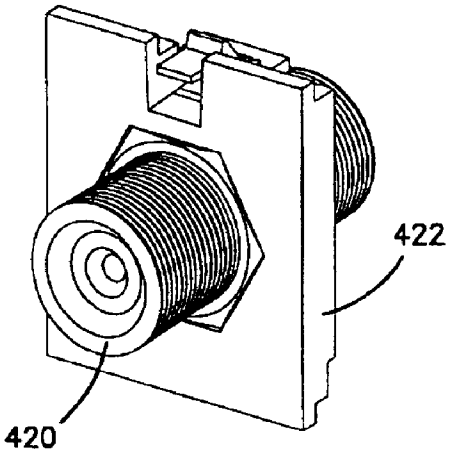
Figure 14E:
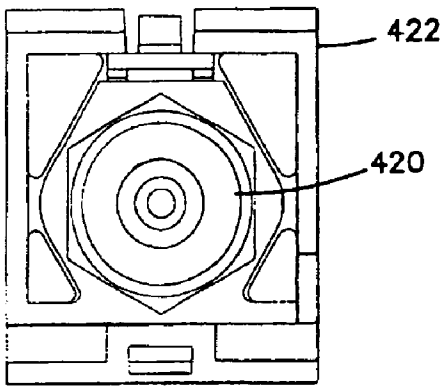
Figure 14D:
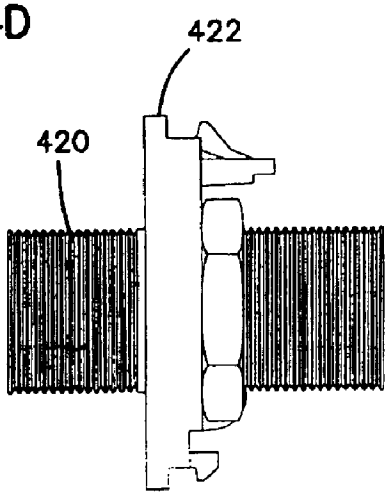
Figure 14C:
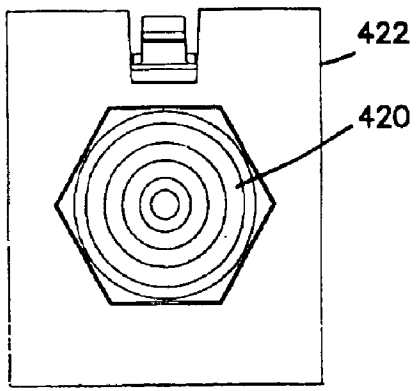
Figures 15A, 15B, 15C, 15D, 15E:
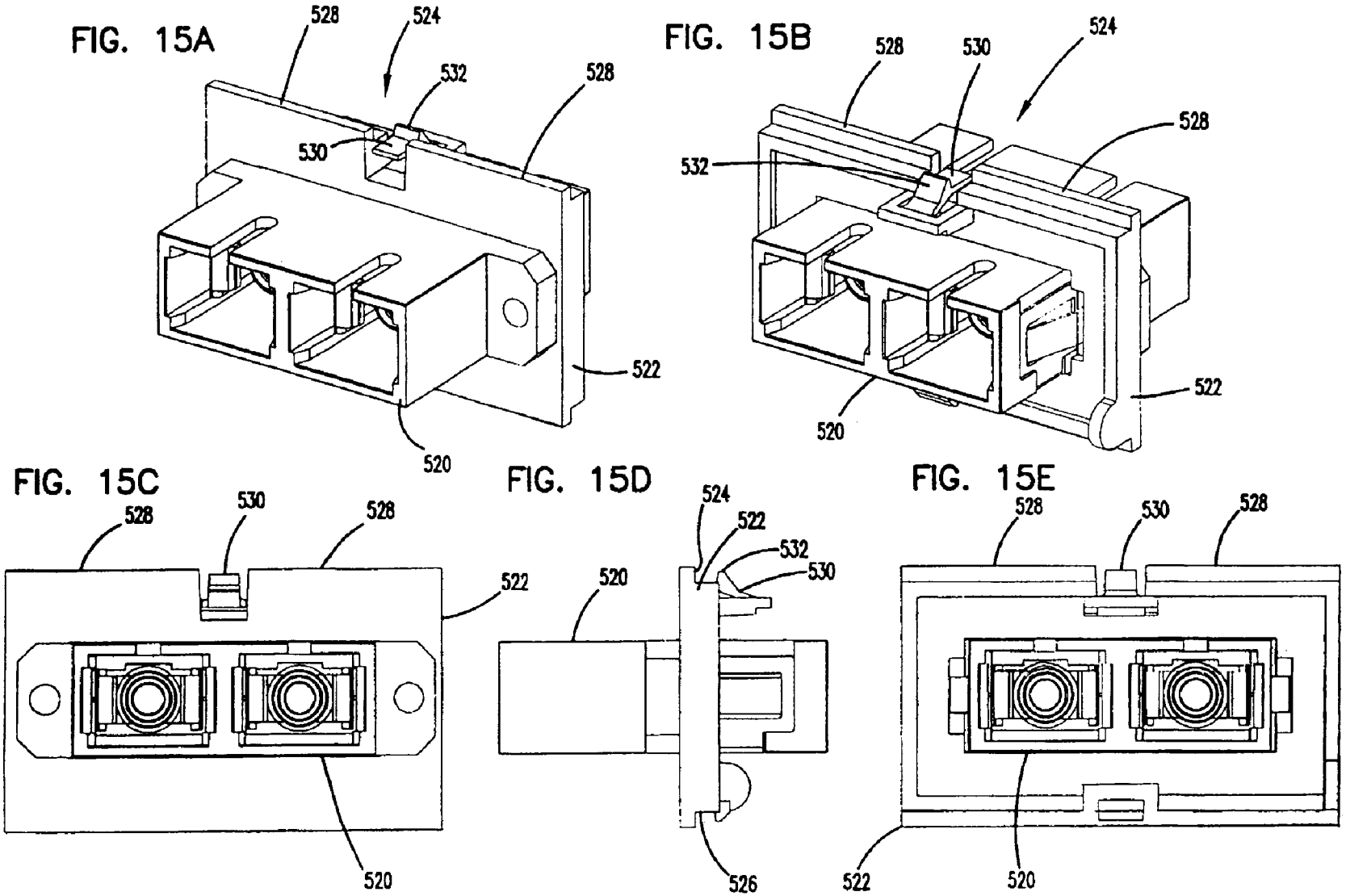
FIGS. 15A–15E illustrate various views of a straight duplex SC-type connector mounted on a support structure adapted to snap-fit within the faceplate of FIGS. 1A and 1B.

FIGS. 10 and 11 illustrate one of the angled jacks 26'. The angled jack 26' uses the same insert assembly 38 used by the straight jack 26. Consequently, no further description of the insert assembly 38 will be provided. The angled jack 26' includes a jack housing 36' that is similar to the jack housing 36 described with respect to the straight jack 26. However, the jack housing 36' has been modified to allow the jack 26' to mount at an angle relative to the faceplate 22. For example, the jack housing 36' includes first and second retaining structures 44' and 46' for providing a snap-fit connection between the jack 26' and the faceplate 22. The first and second retaining structures 44', 46' are preferably aligned along a line 124 that is oriented at an acute angle θ relative to the front face 28' of the jack 26'. Consequently, when the jack 26' is secured to the faceplate 22, the retaining structures 44', 46' cause the front face 28' of the jack 26' to be angled relative to the front face of the faceplate 22.

The first retaining structure 44 includes two fixed retaining shoulders 126 (only one shown) positioned at opposite sides of the jack housing 36'. Similarly, the second retaining structure 46' includes two spaced-apart retaining shoulders 128 positioned on opposite sides of the jack housing 36'. A gap 130 separates the retaining shoulders 128. A resilient cantilever member 132 is positioned within the gap 130. The cantilever member 132 includes a rear stop 134 adapted to engage the back side of the faceplate 22.

Referring to FIG. 8, when the jack 26' is mounted within the upper opening 24 of the faceplate 22, the retaining shoulders 126, 128 engage the front side of the faceplate 22, while the rear stop 134 of the cantilever member 132 engages the back side of the faceplate 22. To mount the jack 26' within the opening 24, the rear portion of the jack is inserted into the opening 24 and the jack 26' is pushed into the opening 24. As the jack 26' is pushed into the opening 24, a ramped surface of the rear stop 134 causes the cantilever member 132 to flex upward until the rear stop 134 passes through the opening 24. Once the rear stop 124 passes through the opening 24, the cantilever member 132 snaps downward thereby bringing the rear stop 134 into engagement with the back side of the faceplate 22. The entire jack 26' can be removed from the faceplate 22 by flexing the cantilever member 132 upward, and concurrently pulling the jack 26' from the opening 24.

Another aspect of the present invention relates to a connector system that allows many different types of connectors to be used with a single, universal faceplate. For example, FIGS. 12A–12E, 13A–13E, 14A–14E, 15A–15E, 16A–16E, 17A–17E, 18A–18E, 19A–19E, 20A–20E, and 21A–21E illustrate a variety of different telecommunications connectors that can be mounted in the openings 24 of the faceplate 22. For example, FIGS. 12A–12E illustrate a straight ST type connector 220 mounted on a support structure or adapter 222 configured to be snap-fit within one of the openings 24 of the faceplate 22. The adapter [22] *222* includes top and bottom shoulders 224 and 226 adapted to engage the front side of the faceplate, and a resilient cantilever member 228 having a rear stop 230 adapted to engage the back side of the faceplate. The adapter [22] *222* has a total width generally equal to one-half the width of the opening 24 of the faceplate 22. The member 228 preferably has a base end having a width less than or equal to one-half the total width 222 of the adapter. The cantilever 228 is preferably positioned within a gap 232 having a width that is less than or equal to corresponding widths of the shoulders 224.

Figure 16B:
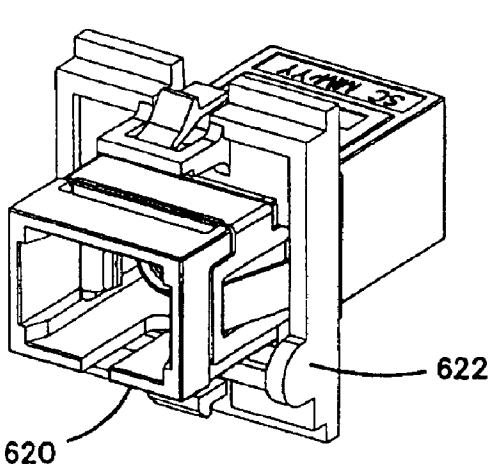
FIGS. 16A–16E illustrate various views of a straight SC-type connector mounted on a support structure adapted to snap-fit within the faceplate of FIGS. 1A and 1B.
Figure 16A:
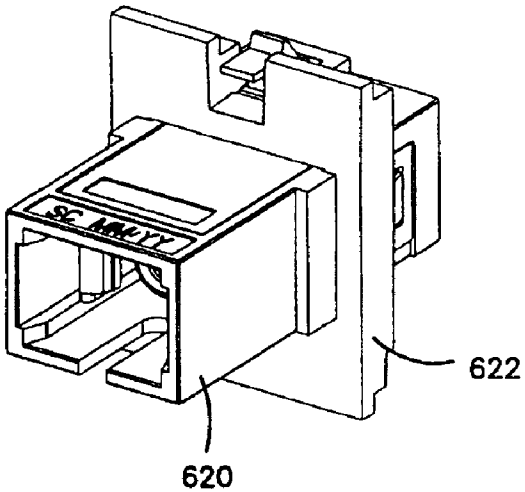
Figure 16E:
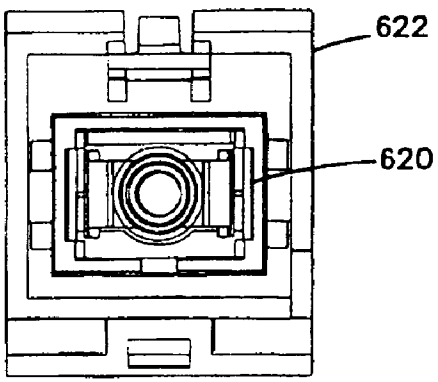
Figure 16D:
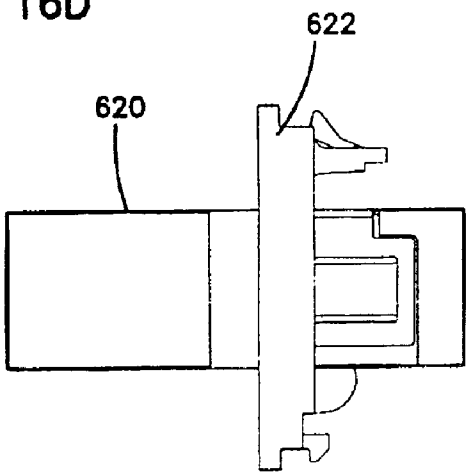
Figure 16C:
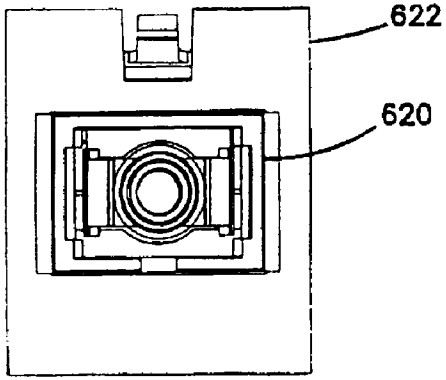
Figure 17B:
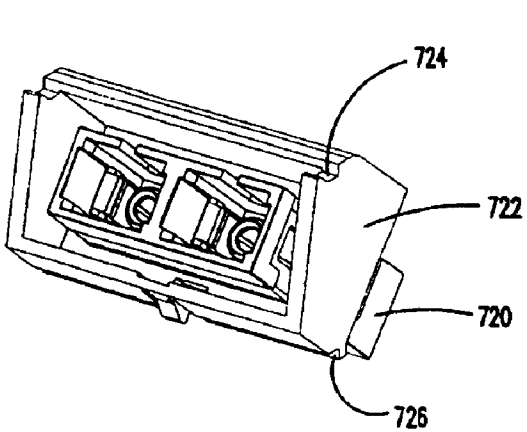
FIGS. 17A–17E illustrate an angled duplex SC-type connector mounted on a support structure adapted to snap-fit within the faceplate of FIGS. 1A and 1B.
Figure 17A:
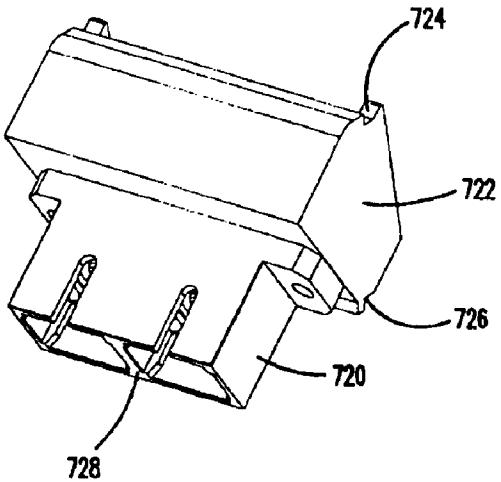
Figure 17E:
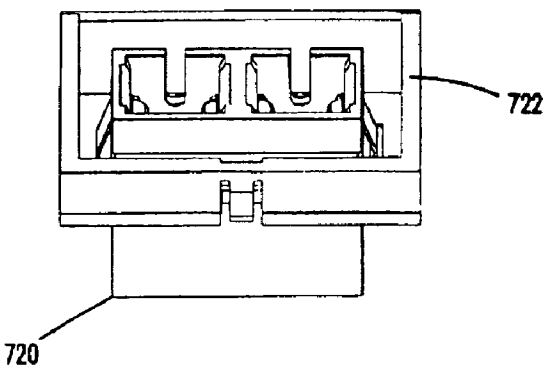
Figure 17D:
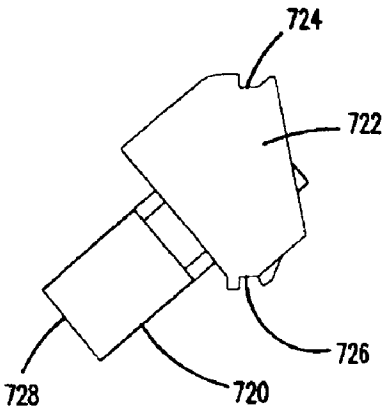
Figure 17C:
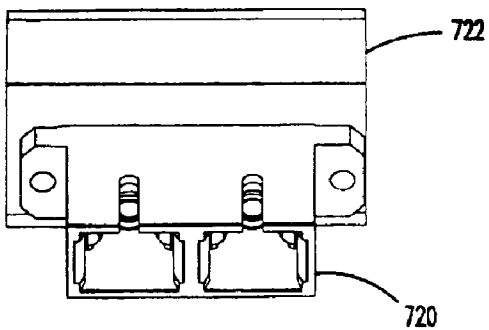
Figure 18B:
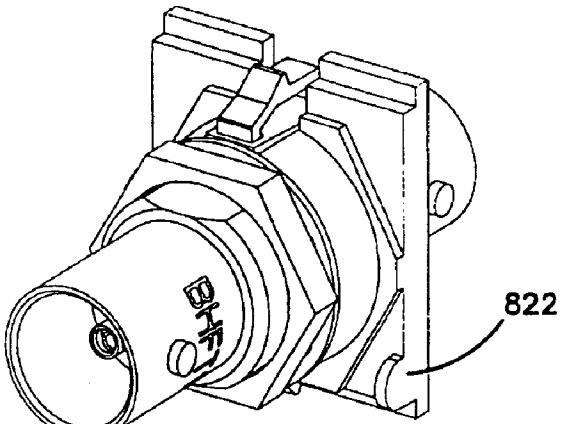
FIGS. 18A–18E illustrate a straight BNC-type connector mounted on a support structure adapted to snap-fit within the faceplate of FIGS. 1A and 1B.
Figure 18A:
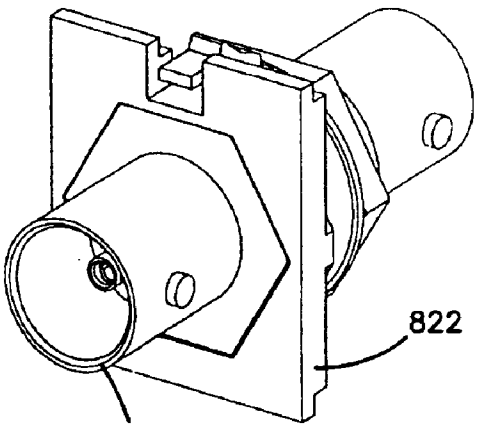
Figure 18D:
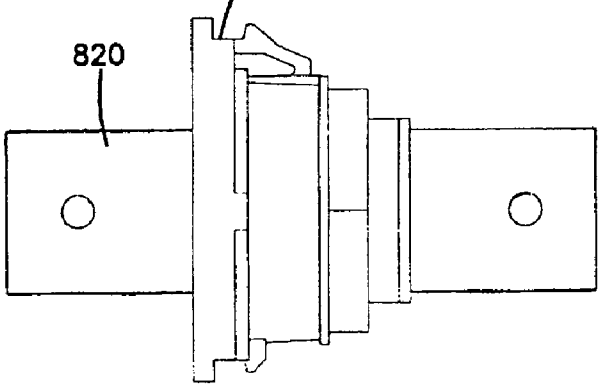
Figure 18E:
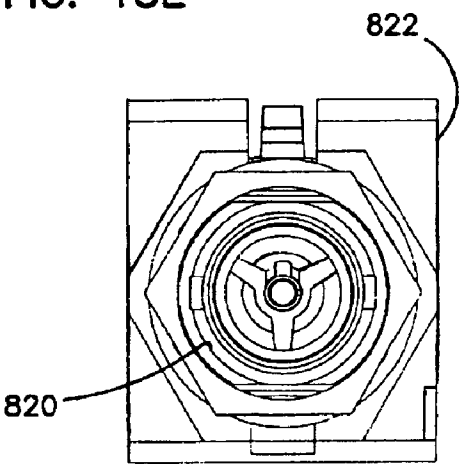
Figure 18C:
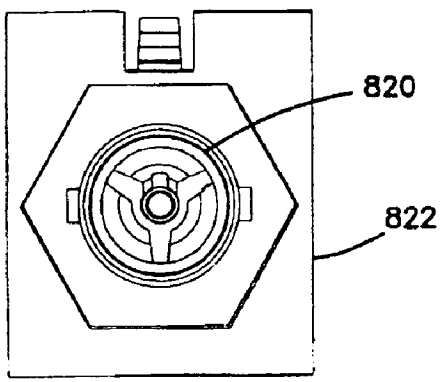
Figure 19B:
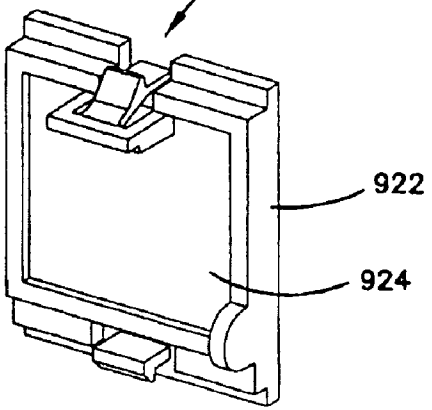
FIGS. 19A–19E illustrate a blank or cover adapted to snap-fit within the faceplate of FIGS. 1A and 1B.
Figure 19A:
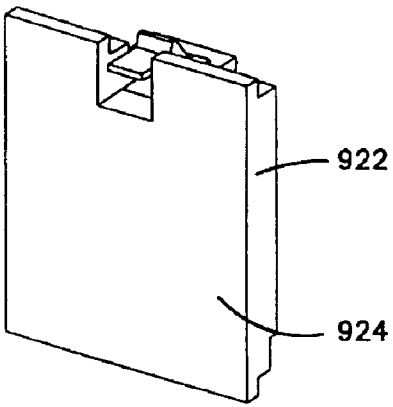
Figure 19E:
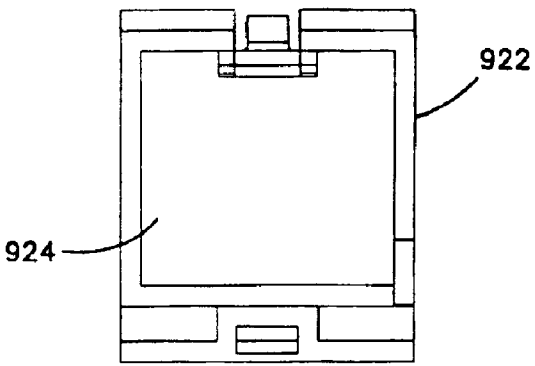
Figure 19D:
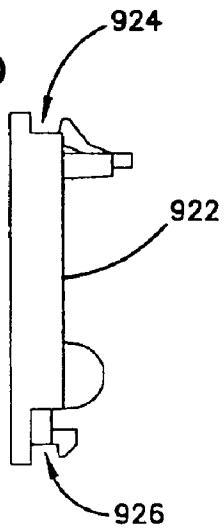
Figure 19C:
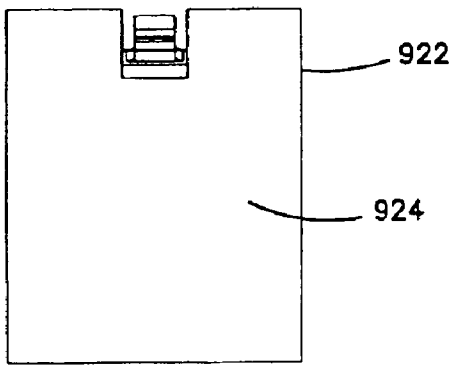
Figure 20A:
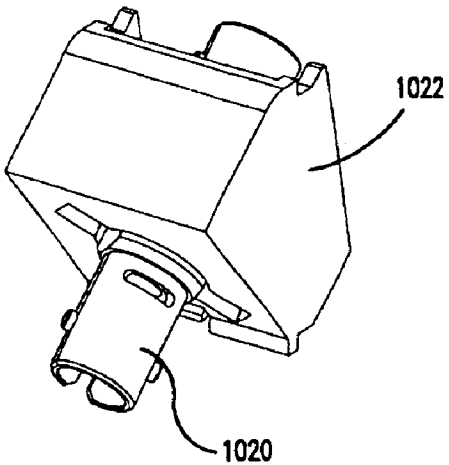
FIGS. 20A–20E illustrate an angled ST-type connector mounted on a support structure adapted to snap-fit within the faceplate of FIGS. 1A and 1B.
Figure 20B:
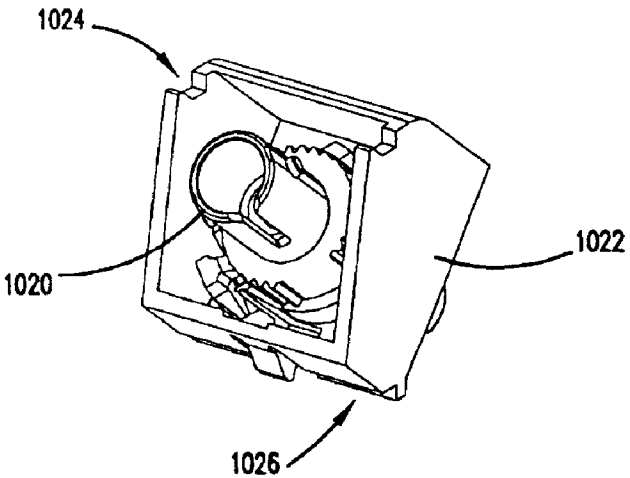
Figure 20C:
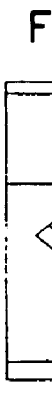
Figure 20D:
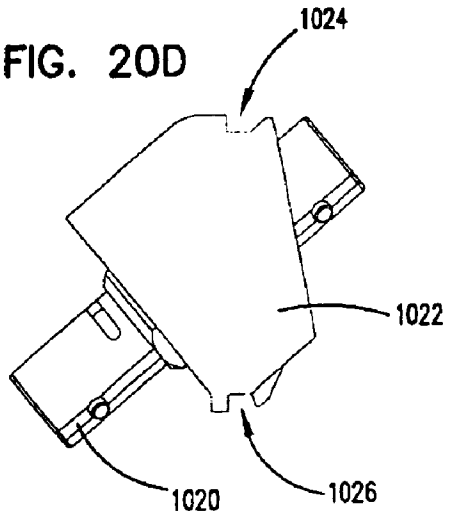
Figure 20E:
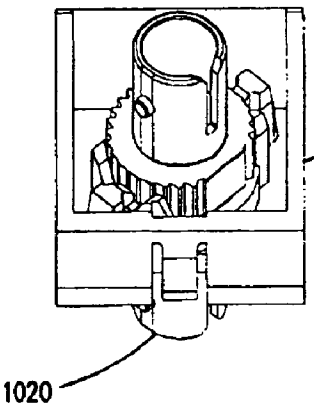
Figure 21B:
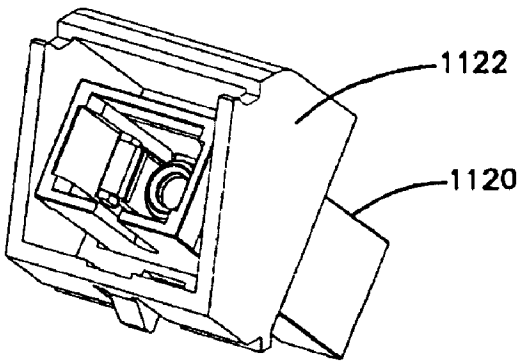
FIGS. 21A–21 E illustrate an angled SC-type connector mounted on a support structure adapted to snap-fit within the faceplate of FIGS. 1A and 1B.
Figure 21E:
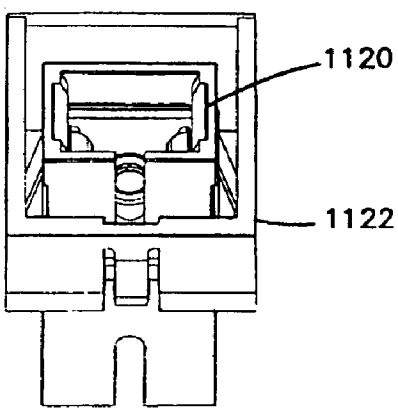
Figure 21A:
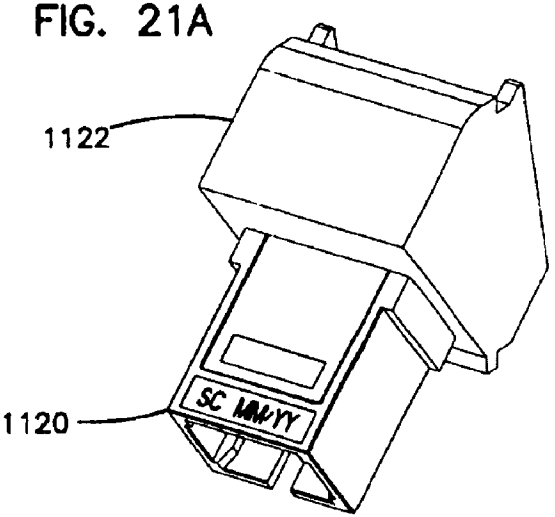
Figure 21D:
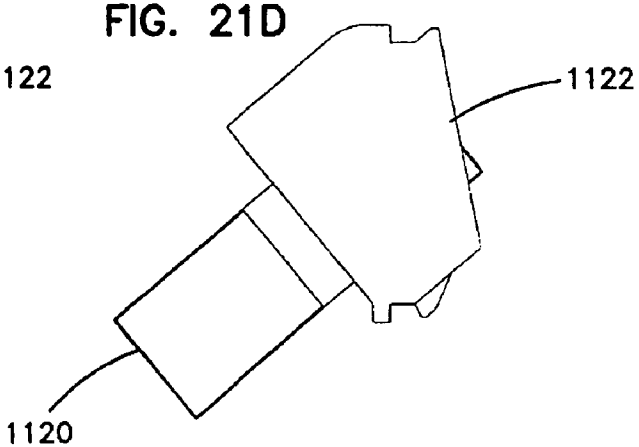
Figure 21C:
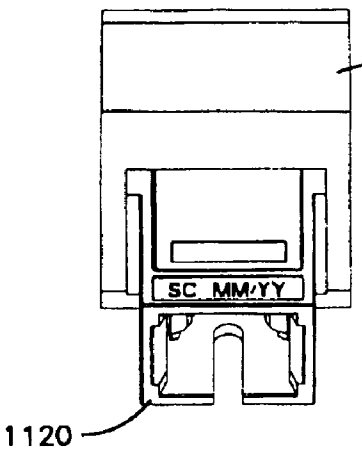

FIGS. 13A–13E show a straight RCA-type connector 320 secured to an adapter 322 configured to snap-fit within the faceplate 22. FIGS. 14A–14E illustrate a straight F-type connector 420 mounted on an adapter 422 configured to snap-fit within the faceplate 22. FIGS. 16–16E show a straight SC-type connector 620 mounted on an adapter 622 configured to snap-fit within the faceplate 22. FIGS. 18A–18E illustrate a straight BNC-type connector 820 mounted on an adapter 822 configured to snap-fit within the faceplate 22. Each of the adapters 332, 422, 622 and 822 has a similar size and configuration as the adapter 222 of FIGS. 12A–12E.

FIGS. 15A–15E illustrates a straight duplex SC-type connector 520 mounted on an adapter 522 configured to snap within one of the openings 24 of the faceplate 22. The adapter 522 is sized to entirely fill one of the holes 24 defined by the faceplate 22. The adapter 522 includes a lower retaining structure 526 (e.g., a slot) and an upper retaining structure 524. The upper retaining structure 524 includes two front shoulders 528 and a resilient cantilever 530 positioned between the shoulders 528. The cantilever 530 includes a rear stop 532.

FIGS. 17A–17E illustrate an angled duplex SC-type connector 720 mounted on an adapter 722. The adapter is sized to fill an entire one of the holes 24 of the faceplate 22. The adapter 722 includes first and second oppositely positioned retaining structures 724, 726 adapted to provide a snap-fit connection with the faceplate 22. The retaining structures 724, 726 are aligned along a line that is oriented at an acute angle with respect to a front face 728 of the connector 720.

FIGS. 19A–19E illustrates a blank 922 configured for covering one half of one of the openings 24 of the faceplate 22. The blank 922 has a planar cover surface 924. The blank 922 also includes first and second oppositely positioned retaining structures 924 and 926 for providing a snap-fit connection with the faceplate 22.

FIGS. 20A–20E illustrate an angled ST-type connector 1020 mounted on an adapter 1022. The adapter 1022 is sized to fill one-half of one of the openings 24 of the faceplate 22. The adapter 1022 includes first and second retaining structures 1024 and 1026 configured to provide a snap-fit connection with the faceplate. The retaining structures 1024, 1026 are aligned along a line or at an acute angle with respect to the front face of the connector 1020.

FIGS. 21A–21E illustrate an angled SC-type connector 1120 mounted on an adapter 1122. The adapter 1122 has substantially the same size and configuration as the adapter 1022 of FIGS. 20A–20E.

With regard to the foregoing description, it is to be understood that changes may be made in detail, especially in matters of the construction materials employed and the shape, size, and arrangement of the parts without departing from the scope of the present invention. It is intended that the specification and depicted aspects of the invention may be considered exemplary, only, with a true scope and spirit of the invention being indicated by the broad meaning of the following claims.

We claim:

1. An insert for a jack for use with a plug having plug contacts, the insert comprising:

a) a connector mount having a main body including a first side positioned opposite from a second side, the connector mount including:

i) a snap-fit connection structure positioned at the main body for securing the connector mount to the jack;

ii) a contact spring holder;

iii) an insulation displacement terminal housing positioned at the first side of the main body;

b) a plurality of contact springs held by the contact spring holder, the contact springs including contact portions positioned at the first side of the main body for engaging the plug contacts of the plug, the contact springs each include a tip positioned at the second side of the main body;

c) a plurality of insulation displacement terminals housed by the insulation displacement terminal housing, the insulation displacement terminals each including a tip positioned at the second side of the main body; and d) a circuit board providing electrical connections between the tips of the insulation displacement terminals and the tips of the contact springs, the circuit board being mounted at the second side of the main body.

2. The insert of claim 1, wherein the snap-fit connection structure includes two flexible lever members each having a locking tab, and the contact springs are positioned generally in a region between the flexible lever members.

3. A jack for use with a mounting fixture having a jack opening, the jack comprising:

A) an insert assembly having a plurality of flexible contact springs and a plurality of connection locations linked to the contact springs;

B) a jack housing body configured to be mounted within the jack opening of the mounting fixture, the jack housing body including a first retaining structure positioned opposite from a second retaining structure, the first and second retaining structures being positioned to engage a front side of the mounting fixture when the jack housing body is mounted in the jack opening;

C) wherein the jack housing body includes a resilient cantilever member having a base end positioned opposite from a free end, the base end being integrally connected with the jack housing body, the cantilever member including a retaining tab positioned near the free end of the cantilever member, the retaining tab being positioned to engage a back side of the mounting fixture when the jack housing body is mounted in the jack opening;

D) wherein the jack housing body includes a front portion positioned opposite from a back portion, the front portion defining an inner chamber and also defining front and rear openings for accessing the inner chamber, the front opening comprising a port sized for receiving a plug, and the back portion of the jack housing body defining an open channel that extends in a rearward direction from the front portion, the jack housing body adapted to receive the insert assembly in the open channel, the jack housing body including a base and two opposite facing side walls, the base and the side walls defining at least a portion of the open channel;

E) wherein the insert assembly includes locking tabs, the jack housing body including a hole in each of the side walls to receive one of the locking tabs;

F) wherein the insert assembly includes outwardly facing slots, the jack housing body including guide rails for receipt in the slots of the insert assembly, wherein the rails are offset from the base so that alignment of the insert assembly within the jack housing body is not dependent on a surface of the insert assembly engaging the base.

4. The jack of claim 3, further including a second resilient cantilever member including a retaining tab positioned to engage the back side of the mounting fixture, the second cantilever member positioned on an opposite side of a front of the jack housing body.

5. The jack of claim 3, wherein the resilient cantilever member includes a front retaining tab to engage the front side of the mounting fixture.

6. The jack of claim 4, wherein the second cantilever member includes an open front end not engageable with the front side of the mounting fixture.

*7. A jack comprising:*

*a jack housing defining a port for receiving a plug;*

*an insert adapted to be inserted into the jack housing, the insert including:*

*a circuit board having a first side positioned opposite from a second side, the circuit board also including a front end positioned opposite from a rear end;*

*a plurality of insulation displacement terminals positioned at the first side of the circuit board for terminating wires to the jack insert;*

*an insulation displacement terminal housing for supporting the insulation displacement terminals at the first side of the circuit board, the insulation displacement housing being positioned adjacent to the rear end of the circuit board;*

*a plurality of contact springs terminated to the first side of the circuit board, the contact springs including contact sections positioned at the first side of the circuit board and located adjacent the front end of the circuit board, wherein when the insert is positioned within the jack housing, the contact sections are adapted for contacting the plug inserted within the port of the jack housing; and*

*a divider positioned at the first side of the circuit board for separating the contact springs, the divider including channels that receive the contact springs, the channels having open sides that face away from the first side of the circuit board.*

*8. The jack of claim 7, wherein the insert further includes elongate tabs for providing a snap-fit connection between the insert and the jack housing, the elongate tabs being elongated in a direction that extends generally between the front and rear ends of the circuit board.*

*9. The jack of claim 8, wherein the elongate tabs have cantilevered configurations and each include a base end and a free end, and wherein the free ends include ramp surfaces.*

*10. The jack of claim 8, wherein at least portions of the contact springs are located generally between the tabs.*

*11. The jack of claim 7, wherein the insert further includes two tabs for providing a snap-fit connection between the insert and the jack housing, at least portions of the contact springs being located generally between the tabs.*

*12. The jack of claim 7, wherein the insert further includes elongate tabs having a cantilevered configuration, the tabs being elongated in a direction that extends generally between the front and rear ends of the circuit board, the tabs being located at the first side of the circuit board, and the tabs being located on opposite sides of the divider.*

*13. The jack of claim 7, wherein the insulation displacement terminal housing and the divider are part of a one-piece main body.*

*14. The jack of claim 7, wherein the jack includes elongate tabs for providing a snap-fit connection between the insert and the jack housing, the elongate tabs having a cantilevered configuration.*

*15. The jack of claim 7, wherein the jack housing includes a front and a back, wherein the jack housing defines the port at the front of the jack housing, and wherein the back of the jack housing defines a rear opening for allowing the insert to be inserted into the jack housing.*

*16. A jack comprising:*

*a jack housing defining a port for receiving a plug;*

*an insert adapted to be inserted into the jack housing, the insert including:*

*a circuit board having a first side positioned opposite from a second side, the circuit board also including a front end positioned opposite from a rear end;*

*a plurality of insulation displacement terminals positioned at the first side of the circuit board for terminating wires to the jack insert;*

*an insulation displacement terminal housing for supporting the insulation displacement terminals at the first side of the circuit board;*

*a plurality of contact springs including contact sections positioned at the first side of the circuit board, wherein when the insert is positioned within the jack housing, the contact sections are adapted for contacting the plug inserted within the port of the jack housing;*

*a contact spring holder positioned at the first side of the circuit board; and*

*at least one of the insert and the jack housing including elongate tabs for providing a connection between the jack housing and the insert, the elongate tabs having a cantilevered configuration.*

*17. The jack of claim 16, wherein the elongate tabs include base ends and free ends, and wherein the free ends include ramp surfaces.*

*18. The jack of claim 17, wherein the elongate tabs are part of the insert and are elongated in a direction that extends generally between the front and rear ends of the circuit board.*

*19. The jack of claim 18, wherein at least portions of the contact springs are located generally between the elongated tabs.*

*20. The jack of claim 19, wherein the elongate tabs are located on opposite sides of the contact spring holder, and wherein the contact springs are terminated to the first side of the circuit board.*

*21. The jack of claim 16, wherein the insulation displacement terminal housing and the contact spring holder are part of a one-piece main body.*

*22. The jack of claim 16, wherein the jack housing includes a front and a back, wherein the jack housing defines the port at the front of the jack housing, and wherein the back of the jack housing defines a rear opening for allowing the insert to be inserted into the jack housing.*

*23. A jack comprising:*

*a jack housing defining a port for receiving a plug;*

*an insert adapted to be inserted into the jack housing, the insert including:*

*a circuit board having a first side positioned opposite from a second side, the circuit board also including a front end positioned opposite from a rear end;*

*a plurality of insulation displacement terminals positioned at the first side of the circuit board for terminating wires to the jack insert;*

*an insulation displacement terminal housing for supporting the insulation displacement terminals at the first side of the circuit board, the insulation displacement housing being positioned adjacent to the rear end of the circuit board;*

*a plurality of contact springs including contact sections positioned at the first side of the circuit board and located adjacent the front end of the circuit board, wherein when the insert is positioned within the jack housing, the contact sections are adapted for contacting the plug inserted within the port of the jack housing;*

*a contact spring holder positioned at the first side of the circuit board; and*

*two tabs each having a ramped surface, the tabs being positioned on opposite sides of the contact springs.*

*24. The jack of claim 23, wherein the tabs are located on opposite sides of the contact spring holder, and wherein the contact springs are terminated to the first side of the circuit board.*

*25. The jack of claim 23, wherein the insulation displacement terminal housing and the contact spring holder are part of a one-piece main body.*

*26. The jack of claim 23, wherein the jack housing includes a front and a back, wherein the jack housing defines the port at the front of the jack housing, and wherein the back of the jack housing defines a rear opening for allowing the insert to be inserted into the jack housing.*

*27. A jack comprising:*

*a jack housing defining a port for receiving a plug;*

*an insert adapted to be inserted into the jack housing, the insert including:*

*a circuit board having a first side positioned opposite from a second side, the circuit board also including a front end positioned opposite from a rear end;*

*a plurality of insulation displacement terminals positioned at the first side of the circuit board for terminating wires to the jack insert;*

*an insulation displacement terminal housing for supporting the insulation displacement terminals at the first side of the circuit board, the insulation displacement housing being positioned adjacent to the rear end of the circuit board;*

*a plurality of contact springs terminated to the first side of the circuit board, the contact springs including contact sections positioned at the first side of the circuit board and located adjacent the front end of the circuit board, wherein when the insert is positioned within the jack housing, the contact sections are adapted for contacting the plug inserted within the port of the jack housing; and*

*first and second combs positioned at the first side of the circuit board for separating the contact springs, the second comb being positioned closer to the front end of the circuit board than the first comb.*

*28. The jack of claim 27, wherein the jack further includes elongate tabs for providing a snap-fit connection between the insert and the jack housing.*

*29. The jack of claim 28, wherein the elongate tabs are part of the insert and are positioned on opposite sides of the first comb.*

*30. The jack of claim 27, wherein the insulation displacement terminal housing and the contact spring holder are part of a one-piece main body.*

*31. The jack of claim 27, wherein the first comb defines channels having open sides that face away from the first side of the circuit board.*

*32. The jack of claim 27, wherein the jack housing includes a front and a back, wherein the jack housing defines the port at the front of the jack housing, and wherein the back of the jack housing defines a rear opening for allowing the insert to be inserted into the jack housing.*

*33. A jack comprising:*

*a jack housing including a front positioned opposite from a rear, the front of the jack housing defining a port for receiving a plug, the rear of the jack housing defining a rear opening;*

*an insert adapted to be inserted into the jack housing through the rear opening of the jack housing, the insert including:*

*a circuit board having a first side positioned opposite from a second side, the circuit board also including a front end positioned opposite from a rear end;*

*a plurality of insulation displacement terminals positioned at the first side of the circuit board for terminating wires to the jack insert;*

*an insulation displacement terminal housing for supporting the insulation displacement terminals at the first side of the circuit board;*

*a plurality of contact springs terminated to the first side of the circuit board, the contact springs including contact sections positioned at the first side of the circuit board, wherein when the insert is positioned within the jack housing, the contact sections are adapted for contacting the plug inserted within the port of the jack housing; and*

*a slide interface for providing alignment between the insert and the jack housing, the slide interface including a pair of elongate guide members that slide within corresponding elongate slots.*

*34. The jack of claim 33, wherein the elongate guide members include rails provided within the jack housing, and wherein the elongate slots are provided along sides of the insert.*

*35. An insert for mounting within a jack, the insert comprising:*

*a) a connector mount having a first side positioned opposite from a second side, the connector mount including:*

*i) a divider including a plurality of channels having open sides that face away from the first side of the connector mount;*

*ii) an insulation displacement terminal housing positioned at the first side of the connector mount;*

*b) a plurality of contact springs separated by the divider; and*

*c) a circuit board having a first side and a second side, the contact springs being terminated to the first side of the circuit board, and the circuit board being mounted at the second side of the connector mount with the first side of the circuit board facing toward the second side of the connector mount.*

*36. The insert of claim 35, wherein the connector mount is a single, unitary piece.*

*37. An insert for a jack, the insert comprising:*

*a) a connector mount including a first side positioned opposite from a second side, the connector mount including:*

*i) two elongate tabs positioned at the first side of the connector mount, each tab having an end including a ramp surface;*

*ii) a front divider positioned at the first side of the connector mount;*

*iii) a rear connector assembly positioned at the first side of the connector mount, the rear connector assembly including two rows of means for terminating conductive wires extending from the first side on opposite sides of the first side;*

*b) a plurality of contact springs separated by the divider, the contact springs each including a main bend between a base end portion and a free end portion, the base end portion including a distal tip; and*

*c) a circuit board providing electrical connections between the rear connector assembly and the contact springs, the circuit board being mounted at the second side of the connector mount, with the distal tips of the contact springs mounted to the circuit board.*

*38. The insert of claim 37, wherein the divider defines a plurality of open slots that receive and separate the contact springs, the open slots having open sides that face away from the first side of the connector mount.*

*39. The insert of claim 37, wherein the connector mount is a single, unitary piece.*

*40. The insert of claim 37, wherein at least portions of the springs and the divider are positioned between the elongate tabs.*

*41. An insert for a jack, the insert comprising*

*a) a connector mount having a first side positioned opposite from a second side, the connector mount including:*

*i) a divider positioned at the first side of the connector mount;*

*ii) an insulation displacement terminal housing positioned at the first side of the connector mount;*

*iii) elongate tabs positioned at the first side of the connector mount;*

*b) a plurality of contact springs separated by the divider; and*

*c) a circuit board to which the contact springs are terminated, the circuit board being mounted at the second side of the connector mount.*

*42. The insert of claim 41, wherein the divider includes channels having open sides that face away from the first side of the connector mount.*

*43. The insert of claim 41, wherein at least portions of the contact springs are positioned between the elongate tabs.*

*44. The insert of claim 41, wherein the divider is positioned between the elongate tabs.*

*45. The insert of claim 41, wherein the connector mount comprises a single, unitary piece.*

*46. The insert of claim 41, wherein the elongate tabs each include a free end having a ramp surface.*

* * * * *